United States Patent
Nomura et al.

(10) Patent No.: US 6,634,199 B2
(45) Date of Patent: Oct. 21, 2003

(54) SURFACE TREATING METHOD, AND TREATING MEMBER THEREFOR

(75) Inventors: Seiji Nomura, Hiroshima (JP);
Toshiyuki Gendou, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/938,531

(22) Filed: Aug. 27, 2001

(65) Prior Publication Data

US 2002/0026966 A1 Mar. 7, 2002

Related U.S. Application Data

(63) Continuation of application No. PCT/JP00/09303, filed on Dec. 27, 2000.

(30) Foreign Application Priority Data

Dec. 27, 1999 (JP) .............................. 11-371096
Dec. 27, 1999 (JP) .............................. 11-371097
Dec. 27, 1999 (JP) .............................. 11-371098
Dec. 25, 2000 (JP) .............................. 2000-393328

(51) Int. Cl.$^7$ .............................................. B21B 27/06
(52) U.S. Cl. ...................... 72/75; 72/67; 72/69; 72/112
(58) Field of Search ............................. 72/67, 68, 74, 72/75, 112, 115, 125, 126, 69; 29/90.01; 228/2.1, 112.1; 148/695, 696

(56) References Cited

U.S. PATENT DOCUMENTS

| 3,735,615 A | * | 5/1973 | Shneider .................... 72/75 |
| 4,398,407 A | * | 8/1983 | DeFay, Jr. ................... 72/75 |
| 5,596,896 A | * | 1/1997 | Snell .......................... 72/75 |
| 5,971,252 A |   | 10/1999 | Rosen et al. |
| 5,980,681 A | * | 11/1999 | Siemroth et al. .......... 29/90.01 |
| 6,415,486 B1 | * | 7/2002 | Prevey, III ................. 29/90.01 |

FOREIGN PATENT DOCUMENTS

| JP | 02015866 | 1/1990 |
| JP | 05340297 | 12/1993 |
| JP | 08155628 | 6/1996 |
| JP | 10183316 | 7/1998 |
| JP | 2000-015426 | 1/2000 |
| JP | 2000-336465 | 12/2000 |

OTHER PUBLICATIONS

Dawes, C.J., "An Introduction to Friction Stir Welding and Its Development," *Welding and Metal Fabrication, IPC Ltd.*, Haywards Heath, GB, vol. 63, No. 1, 1995, pp. 13–14 and 16.

Reynolds, A.P., "Visualization of Material Flow in an Autogenous Friction Stir Weld," *International Symposium on Friction Stir Welding*, Jun. 14, 1999, pp. 1–9.

Liu, G., et al., "Microstructural Aspects of the Friction–Stir Welding of 6061–T6 Aluminum," *Scripta Materialia*, vol. 37, No. 3, pp. 355–361, Aug. 1, 1997.

* cited by examiner

Primary Examiner—Ed Tolan

(57) ABSTRACT

Via a first path (P1) which extends for continuous treatment from one longitudinal end to the other of a cylinder head (H) passing between pairs of exhaust ports (15) and pairs of intake ports (14) opposed to each other with respect to one cylinder and which terminates in a tension bolt hole (21), and via second paths (P2P5) which, after treatment by this first path (P1), extend for successive treatment from cylinders adjacent the terminal point of the first path (P1) and between a pair of exhaust ports (15) and a pair of intake ports (14) opposed to each other and which terminate in tension bolt holes (21), the surface of the cylinder head (H) is stirred for refining without melting it by the heat from a rotating tool.

9 Claims, 35 Drawing Sheets

FIG. 7

CHEMICAL COMPONENTS (% BY WEIGHT)

| SYMBOL | Cu | Si | Mg | Zn | Fe | Mn | Ti | Al |
|---|---|---|---|---|---|---|---|---|
| AC4D | 1.0~1.5 | 4.5~5.5 | 0.4~0.6 | ≦0.3 | ≦0.6 | ≦0.5 | ≦0.2 | BALANCE |

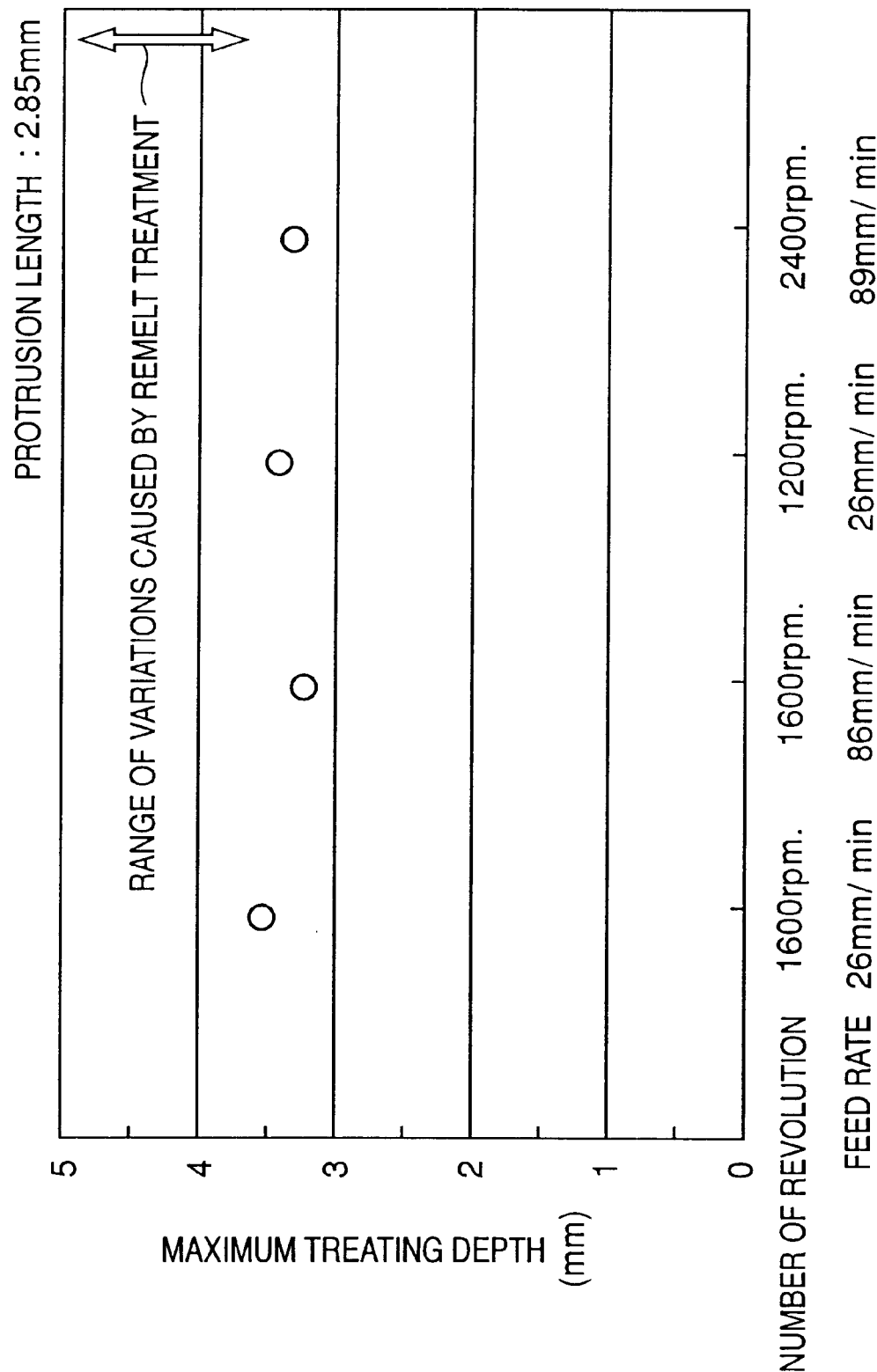

R2

SURFACE TREATING METHOD, AND TREATING MEMBER THEREFOR

This application is a continuation of PCT/JP00/09303 filed Dec. 27, 2000.

TECHNICAL FIELD

The present invention relates to a surface treating method of an aluminum alloy casting, for example, and to a treating member therefor.

BACKGROUND ART

Recent years, the highest compression pressure within a combustion chamber has increased from about 120 kgf/cm$^2$ to about 150 kgf/cm$^2$ with an increase in power of diesel engines used for automobiles, so that the heat load applied to an aluminum alloy casting such as a cylinder head constituting the chamber has also increased. Therefore, a remelt treatment has locally been performed (for example, between adjacent ports (a space between valves)) in order to improve heat resistance to thermal fatigue or thermal stresses (see FIG. 30). Further, the depth of the remelt portion being required has also become greater than before.

FIG. 34 is a flowchart illustrating a manufacturing process of a cylinder head used for a conventional diesel engine. FIG. 35 is a schematic diagram illustrating the remelt treatment in the manufacturing process of FIG. 34.

At step T1, the cylinder head, as an intermediate, is cast as illustrated in FIG. 34. At step T2, the casting is removed from a mold, then a sprue gate is cut. At step T3, the casting is subjected to a T6 heat treatment mainly for the purpose of sand stripping. At step T4, pre-processing for the remelt treatment is conducted. At step T5, the cast is pre-heated. At step T6, the space between valves of the cast is subjected to the remelt treatment. At step T7, the cast is subjected to the T6 heat treatment again. At step T8, a finish processing is conducted.

In the remelt treatment, as shown in FIG. 35, the cast which was subjected to the sand stripping is pre-heated, then an electrode is brought close to the region to be surface-treated and is moved while producing a TIG or plasma arc between the electrode and a member to be surface-treated, in order to melt a texture to be treated to a predetermined depth and to solidify the texture again. Therefore, this treatment has effects of making the metal texture finer and of increasing its elongation by achieving a reduction of casting defects. Further, the residual stress which is caused by the remelt treatment is released by performing the T6 heat treatment again after the remelt treatment. In the remelt treatment, the metal texture is made finer by increasing a cooling rate during the re-solidification.

As another surface treating method, Japanese Patent Application Laid-Open No. 7-88645 discloses a structure which enhances its adhesion with a base material and intends to improve resistance to thermal fatigue, by means of padding an Al—Cu based alloy having a higher solidus than the base material to the space between valves in order to form a high strength layer.

Further, though in a different technical field than the surface treating technology, Japanese Patent No. 2712838 discloses a welding technology wherein probes are inserted while being rotated into joint surfaces of the two members and translated, then the metal textures which are close to the joint surfaces are plasticized by the frictional heat and bonded to each other.

Still further, Japanese Patent Application Laid-Open No. 10-183316 and Japanese Patent Application Laid-Open No. 2000-15426 disclose a method for treating the surface of a cast, such as an abutting surface for a cylinder block of a cylinder head, wherein a rotating tool whose end portion has a shoulder portion provided with a protrusion is squeezed while being rotated into the surface, then the surface is stirred with the heat in a non-melting state.

However, the above described remelt treatment imposes a restriction on the depth which is capable of being treated, because the shoulder die wear is caused by over-melting due to the small heat capacity of the space between valves, even when an amount of heat input is increased for the purpose of increasing the treating depth such that the depth is adapted to an increase of the heat load which is applied to the cylinder head. In addition, increasing the amount of heat input results in a long solidification time, so that the effect of making the texture finer becomes less and pinhole defects also increase. Therefore, an effect which is obtained by increasing the treating depth is cancelled out, so that it becomes difficult to obtain the intended effect of improving heat resistance.

Further, increasing the amount of heat input also results in the easy occurrence of cracks in the member due to the thermal stresses during the remelt treatment, so that the member is required to be pre-heated. In addition, a base material containing magnesium has a possibility of not providing the required mechanical characteristic because magnesium is vaporized and decreased at the time of melting and the reinforcement width strength improvement of the member becomes small due to the T6 heat treatment which is performed after the remelt treatment.

In terms of quality, ensuring a qualitative stability becomes a problem because the treating depth largely varies due to variations in the amount of heat input and displacements caused by the magnetic arc blow and because the pinhole defects in the treating portion is affected by the gas content of the base material and the blow hole coverage ratio.

In terms of productivity, a shielding gas is required for preventing the melting portion from being oxidized because the treating portion is melted, and further, a process of eliminating a cast surface before the treatment is added in order to prevent the defects caused by gases which are produced from surface oxides or impurities. In addition, a cost reduction has also become a problem because a post heat treatment is required for releasing the high tensile residual stress which is applied to the treating portion.

In addition, the padding which is described in the above publication has a productive problem of how to supply the materials used for this padding and a qualitative problem of suppressing the pinhole defects and ensuring the stability of the base material dilution rate. In addition, a problem caused by melting the base materials also exists as in the case of the remelt treatment.

On the other hand, in the above described Japanese Patent Application Laid-Open No. 10-183316 and Japanese Patent Application Laid-Open No. 2000-15426, treating paths are required to be appropriately set in order to process a large region with the use of a small protrusion while preventing deformation of the material.

The present invention has been made in view of the above described problems, and its object is to provide a surface treating method which can realize a deep treating region while preventing unfilled defects caused by the deformation of the material, and a treating member therefor.

DISCLOSURE OF THE INVENTION

In order to solve the above described problems and to achieve the object, a surface treating method according to the present invention is a surface treating method in which the surface of a cast having concave portions is stirred for refining without melting it by the heat from a rotating tool, wherein the surface treatment is performed such that, in a surface treating path of the above described rotating tool in a region which is in the closest vicinity of the above described concave portion, a material between the above described concave portion and the rotating tool flows in a direction opposite to the travel of the above described rotating tool.

In addition, the surface treating method according to the present invention is a surface treating method in which the surface of a cast having concave portions is stirred for refining without melting it by the heat from a rotating tool, wherein the surface treatment is performed such that, in a surface treating path of the above described rotating tool in a region which is in the closest vicinity of the above described concave portion, a material between the above described concave portion and the rotating tool flows in the same direction as the travel of the above described rotating tool.

In addition, the surface treating method according to the present invention is a surface treating method in which the surface of a cast subjected to the perforating is stirred for refining without melting it by the heat from a rotating tool, wherein the surface treatment is performed such that, by the use of the rotating tool whose diameter is smaller than that of a hole created by the above described perforating, a terminal point of a surface treating path created by the above described rotating tool becomes a position which is subjected to the above described perforating.

And preferably, a plurality of the above described concave portions exist, regions between the above described concave portions are refined by the above described rotating tool, and the above described surface treating paths are set such that the above described refined regions are overlapped.

And preferably, the terminal point of the above described surface treating path is set such that the path passes through the start point of the above described surface treating path.

And preferably, the above described cast is a cylinder head having a pair of intake ports and a pair of exhaust ports corresponding to a plurality of cylinders, a continuous treatment is carried out along a longitudinal direction of the above described cylinder head and between the above described pair of exhaust ports and the above described intake ports, and subsequently the surface treatment is carried out from a cylinder adjacent to the position and between the above described exhaust ports and intake ports.

Further, a surface treating member according to the present invention is a treating member which has concave portions and the surface of which is stirred for refining without melting it by the heat from a rotating tool, wherein the surface treatment is performed such that, in a surface treating path of the above described rotating tool in a region which is in the closest vicinity of the above described concave portion, a material between the above described concave portion and the rotating tool flows in a direction opposite to the travel of the above described rotating tool.

Further, the surface treating member according to the present invention is a treating member which has concave portions and the surface of which is stirred for refining without melting it by the heat from a rotating tool, wherein the surface treatment is performed such that, in the surface treating path of the above described rotating tool in a region which is in the closest vicinity of the above described concave portion, a material between the above described concave portion and the rotating tool flows in the same direction as the travel of the above described rotating tool.

Further, the surface treating member according to the present invention is a treating member which is subjected to the perforating and the surface of which is stirred for refining without melting it by the heat from a rotating tool, wherein the surface treatment is performed such that, by the use of the rotating tool whose diameter is smaller than that of a hole created by the perforating, a terminal point of a surface treating path created by the rotating tool becomes a position which is subjected to the perforating.

BRIEF DESCRIPTION OF THE DRAWINGS

FIG. 7 is a diagram showing a component percentage of an aluminum alloy of this embodiment;

FIG. 9 is a chart showing the treating depth with respect to a number of revolution and a feed rate of the pin-like tool;

BEST MODE FOR CARRYING OUT THE INVENTION

Embodiments of the present invention will be described in detail below with reference to accompanying drawings.

Figure 1:
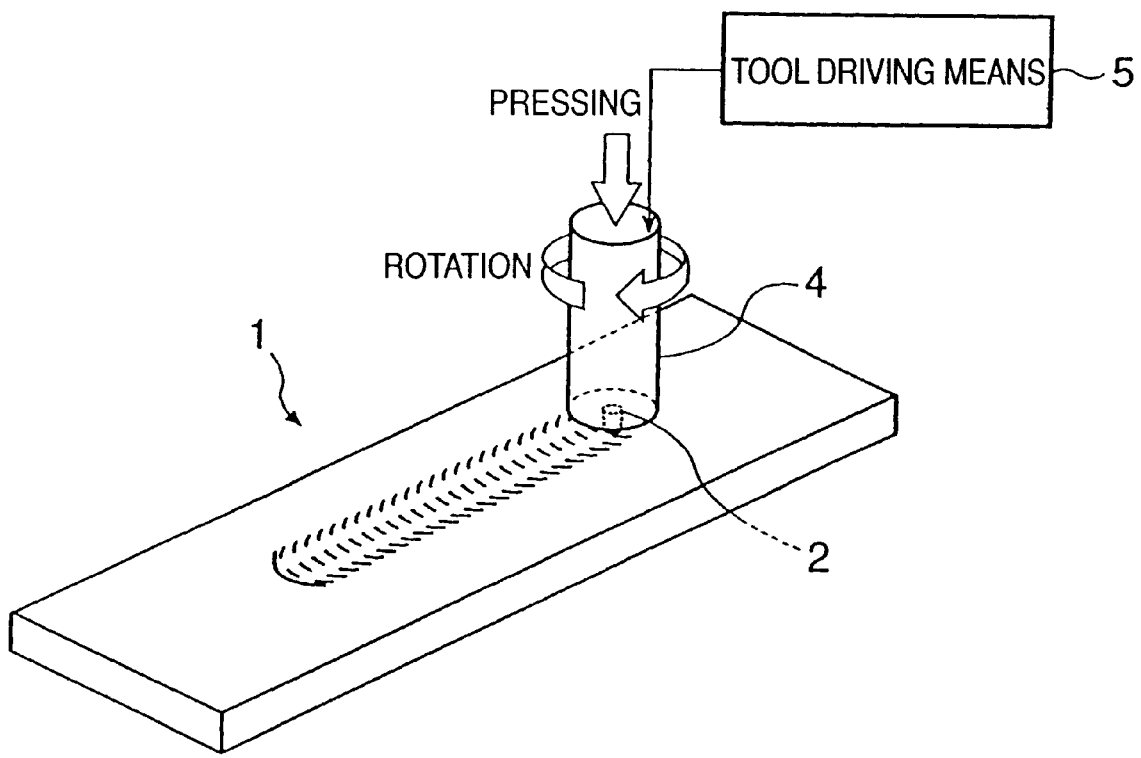
FIG. 1 is a schematic diagram showing a frictional stirrer for practicing a surface treating method of an embodiment according to the present invention.
Figure 2:
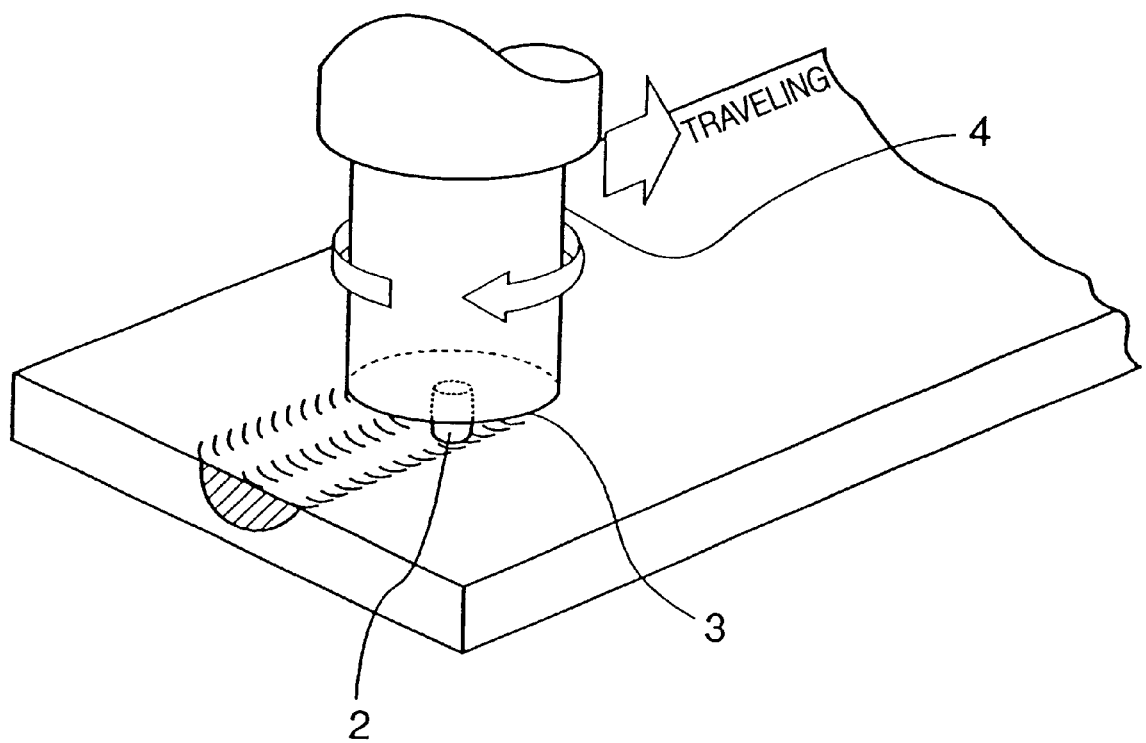
FIG. 2 is an enlarged view of the vicinity of a pin-like tool in FIG. 1.
Figure 3:
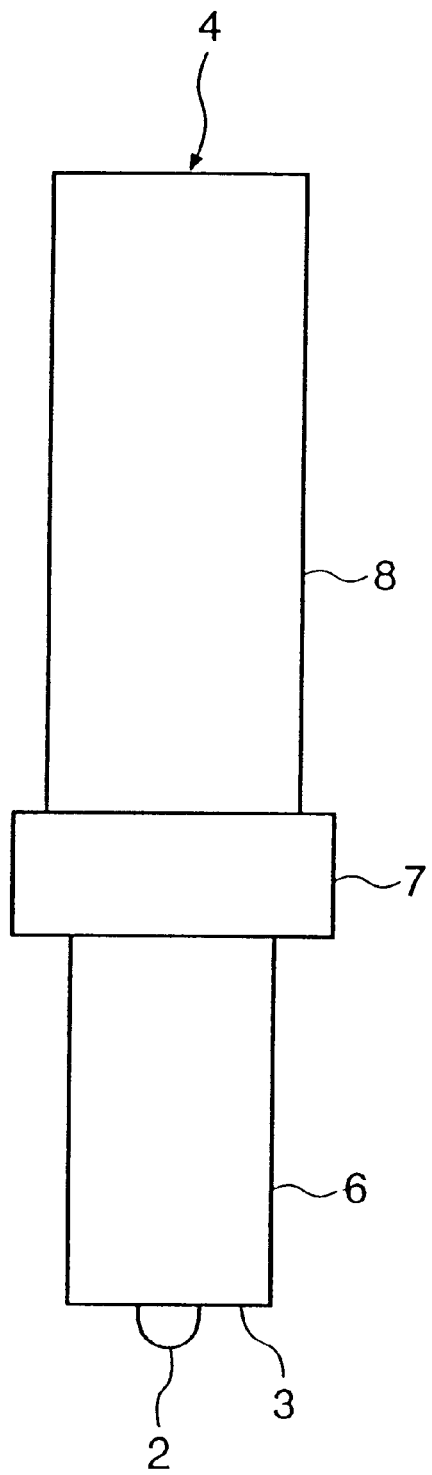
FIG. 3 is a detailed diagram of the pin-like tool.
Figure 4:
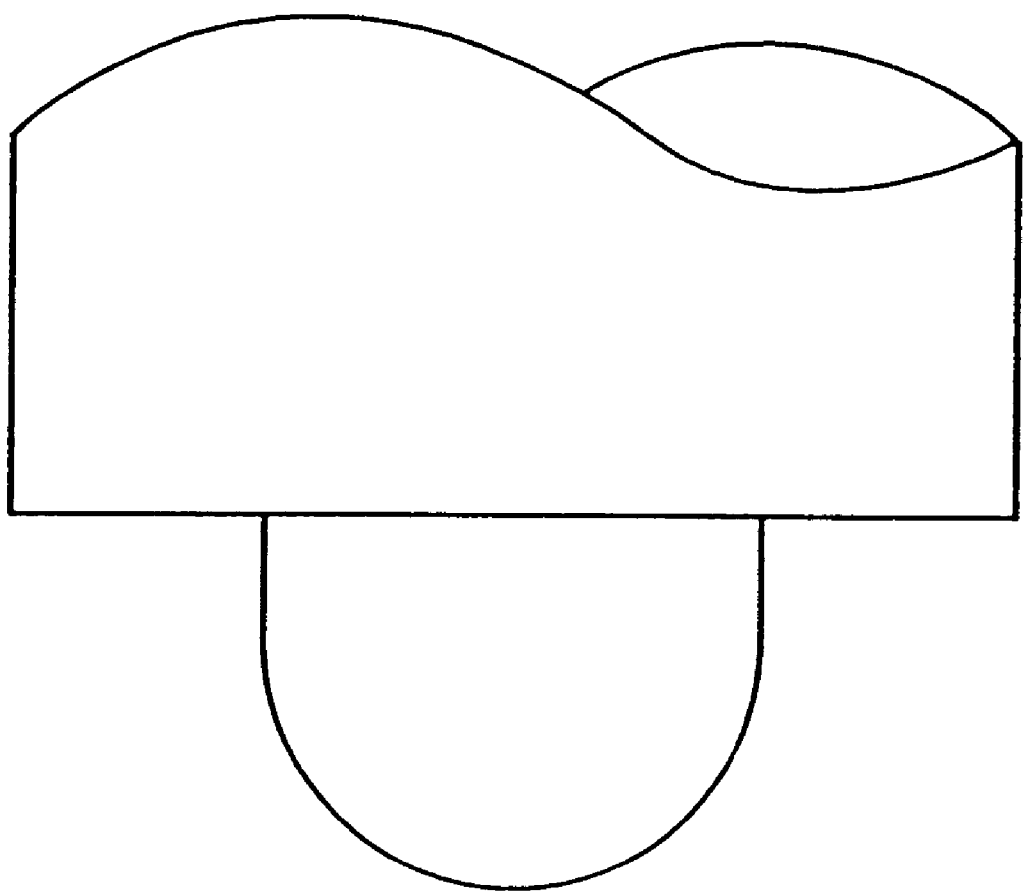
FIG. 4 is a diagram showing a shape of a tip pin of a spherical type.
Figure 5:
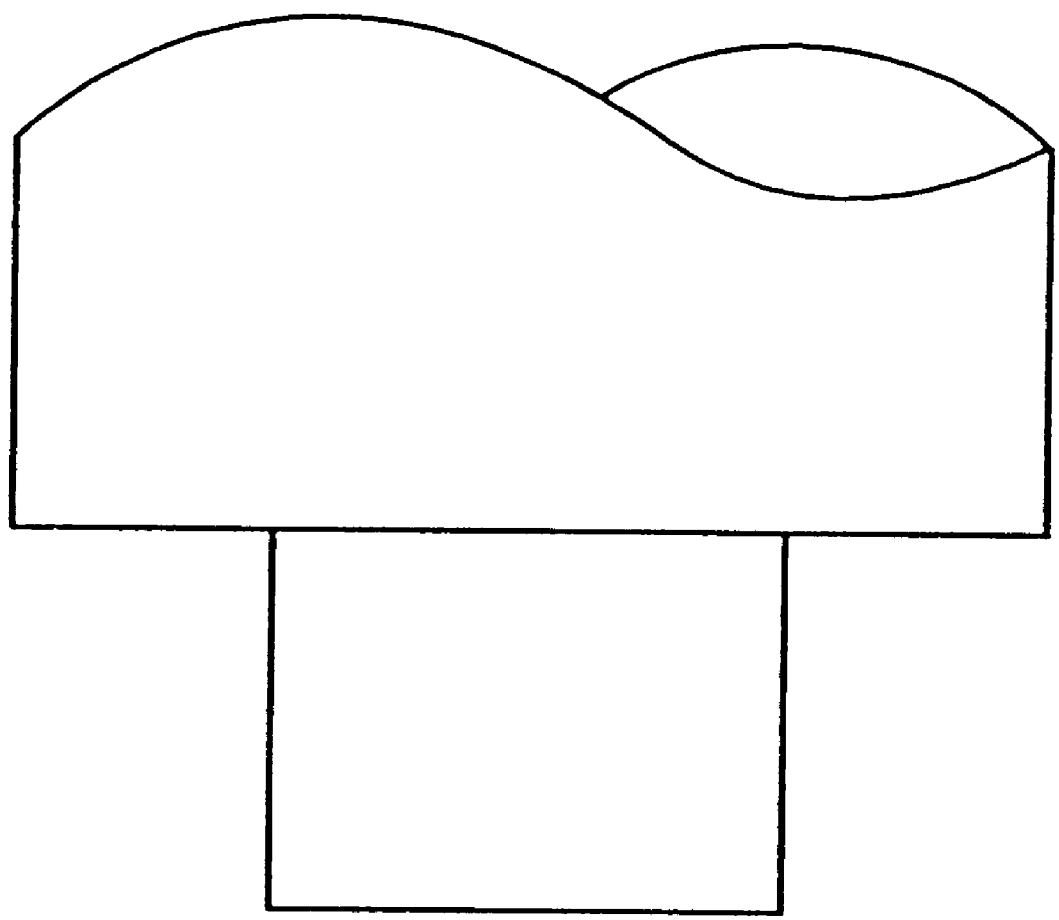
FIG. 5 is a diagram showing a shape of a tip pin of a cylindrical type.
Figure 6:
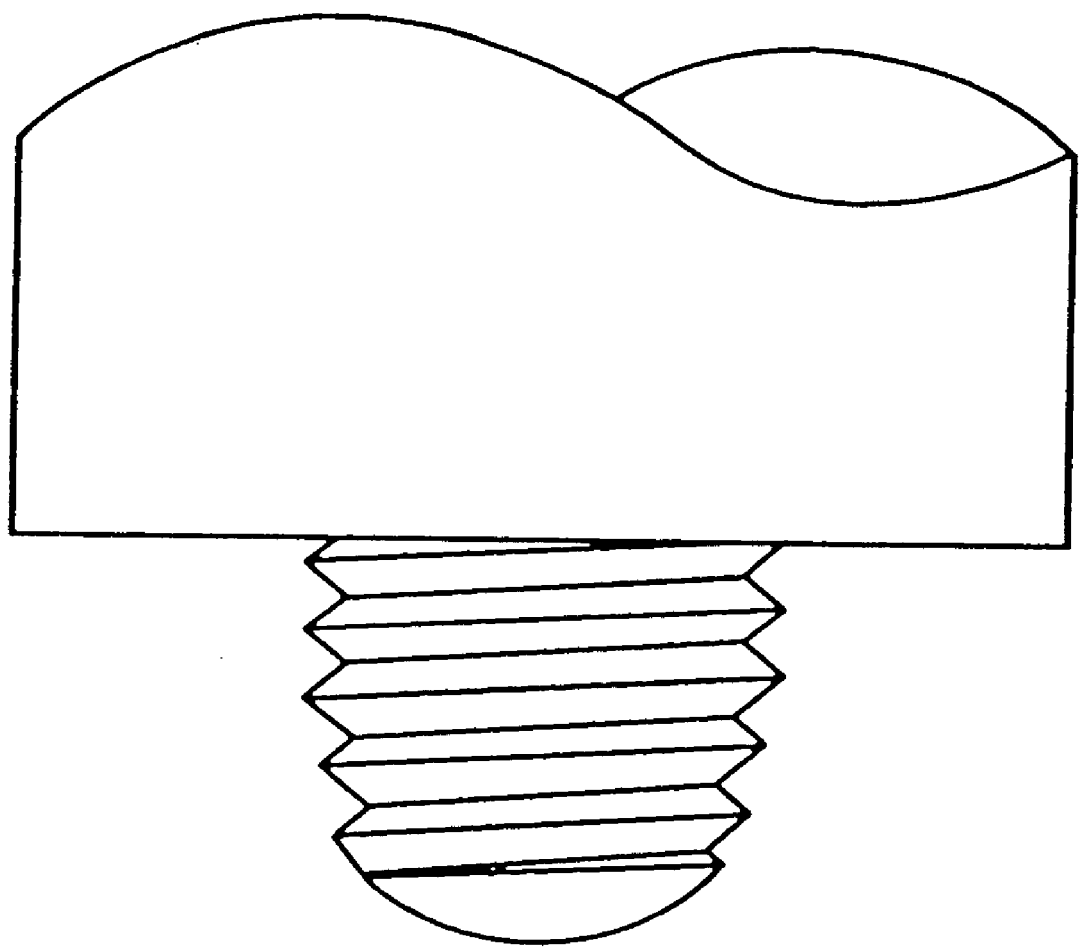
FIG. 6 is a diagram showing a shape of a tip pin of a thread type.

FIG. 1 is a schematic diagram of a frictional stirrer for practicing a surface treating method of an embodiment according to the present invention. FIG. 2 is an enlarged view in the vicinity of a rotating tool in FIG. 1. FIG. 3 is a detailed diagram of the rotating tool. FIG. 4 is a diagram showing the rotating tool having a protrusion whose shape is spherical. FIG. 5 is a diagram showing the rotating tool having a protrusion whose shape is a cylindrical. FIG. 6 is a diagram showing the rotating tool having a protrusion whose shape is a threaded.

A surface treatment performed through frictional stirring of an embodiment according to the present invention is directed to an aluminum alloy casting, as an example of a member to be surface-treated, and is particularly employed for a surface refining treatment of a region between adjacent ports (a space between valves) formed on a cylinder head of an automobile, pistons, and brake discs, for example. This surface treatment intends to achieve, for example, finer metal textures, uniform dispersion of eutectic silicon (Si) particles, and a reduction of casting defects by means of stirring the region to be surface-refined of the aluminum alloy casting without melting it by the frictional heat, so that the material characteristics including thermal fatigue life (low cycle fatigue), elongation, and impact resistance which are in better conditions than those of a conventional remelt treatment can be obtained.

A situation in which the stirring is performed without melting it is meant herein that the stirring is performed with the metal being softened by the frictional heat at a temperature which is even lower than the lowest melting point among the components or eutectic compounds contained in the base material.

As shown in FIGS. 1 to 3, a frictional stirrer 1 comprises a cylindrical rotating tool 4 having a shoulder portion 3 at a tip thereof to which a spherical non-consumable type of protrusion 2 is secured or mounted, and tool driving means 5 which presses and relatively moves this rotating tool 4 with respect to a surface refining region of the member to be surface-treated while rotationally driving the protrusion 2 as well as rotating this rotating tool 4.

As the tool driving means 5, an apparatus which allows the rotating tool 4 to be rotatable by a motor or the like and allows the rotating tool 4 to be movable in all directions including vertical and lateral directions by a feed screw mechanism or a robot arm or the like, wherein the number of revolution, the feed rate, and the pressing force of the rotating tool 4 are controllable, is used. In another form of the tool driving means 5, the rotating tool 4 may rotatablly pivoted and the member to be surface-treated may be relatively moved in all directions including vertical and lateral directions.

The protrusion 2 and the shoulder potion 3 of the rotating tool 4 are made of a steel material whose hardness is higher than that of the aluminum alloy casting, and a shape of the protrusion 2 is in a spherical form having a predetermined radius. The rotating tool 4 comprises a first cylindrical shaft 6 the shoulder portion 3 of which has the protrusion 2 formed thereon, a second cylindrical shaft 7 having a larger diameter, than the first cylindrical shaft 6, is coupled to an upper end portion of this first cylindrical shaft 6, and a third cylindrical shaft 8 having a diameter being larger than that of the first cylindrical shaft 6 and smaller than that of the second cylindrical shaft 7 which is coupled to an upper portion of the second cylindrical shaft 7. The third cylindrical portion 8 is mounted on the tool driving means 5.

Although the protrusion 2 may be of several types of shapes such as a spherical type (FIG. 4), a cylindrical type (FIG. 5), and a thread type (FIG. 6), the thread type in which a thread groove is formed on the peripheral of the pin is especially preferable because of its high stirring ability.

Although AC4D, material, which is an aluminum alloy standardized in accordance with the JIS, is used as an example of the member to be surface-treated in this embodiment as shown in FIG. 7, the composition ratio is changeable within a certain range, that is, a magnesium (Mg) content can be changed from 0.2 to 1.5% by weight, and a silicon content (Si) can be changed from 1 to 24% by weight and preferably from 4 to 13% by weight of the aluminum alloy. In addition, AC4B, AC2B, and AC8A which is used for a piston can be used. The reason for an upper limit of the silicon content is set to 24% is that the material characteristic or its castability becomes saturated and its stirring property also deteriorates when silicon is further increased.

The aluminum alloy casting containing magnesium enhances its strength by precipitating $Mg_2Si$ by means of the heat treatment. However, if the metal is allowed to melt as in case of the remelt treatment in order to obtain a finer texture, magnesium having a low melting point (650° C.) may be vaporized and its content may be decreased. Thus, when the magnesium content decreases, a desired material characteristic can not be obtained because its hardness and strength are lowered even when the heat treatment is performed.

On the other hand, in the surface treatment conducted by frictional stirring, magnesium will not vaporized since the metal texture is not allowed to be melted, so that the strength of the aluminum alloy casting is enhanced by precipitating $Mg_2Si$ by means of the heat treatment.

Although addition of silicon to the aluminum alloy results in an improvement in its castability (flowability of molten metal, the shrinkage characteristic, and hot crack resistance), the action of eutectic silicon as a kind of defect deteriorates its mechanical characteristics (an elongation).

Eutectic silicon is hard and brittle and becomes a start point of the occurrence of cracks or a propagation path of the cracks, so that the elongation decreases. And a fatigue life of a site which is repeatedly subjected to thermal stresses as in the case of the space between valves also decreases. Further, the metal texture exhibits a morphology such that the eutectic silicon is inline with a dendrite, but it becomes possible to suppress the occurrence of cracks caused by the stress concentration and the propagation of the developed cracks by means of refinement and uniform dispersion of the eutectic silicon.

Figure 8A:
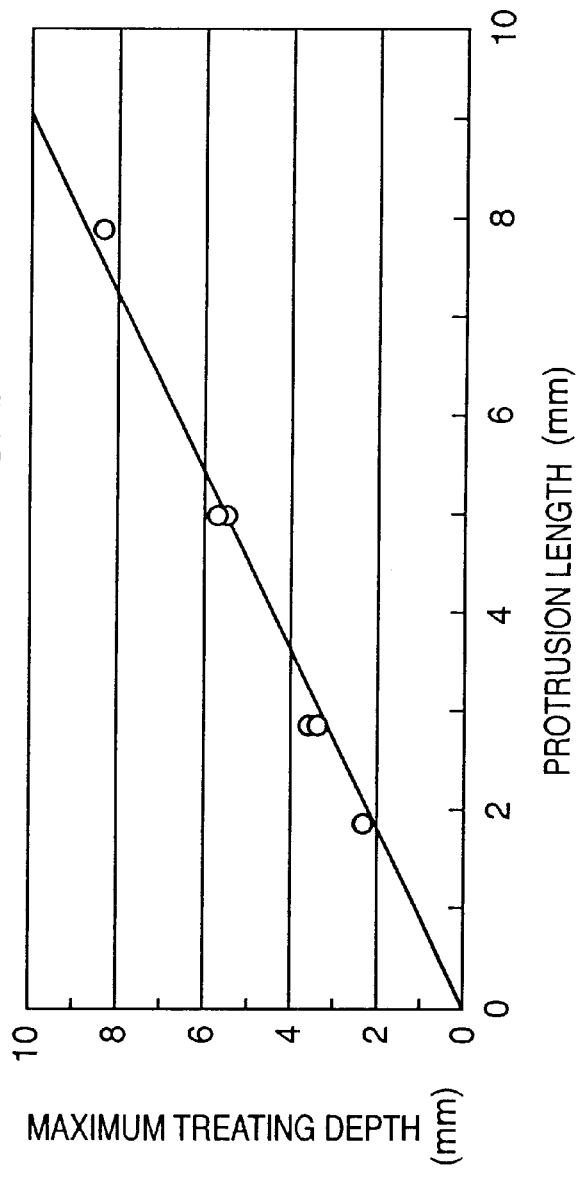
FIG. 8A is a graph showing a treating depth with respect to a length of the tip pin.
Figure 8C:
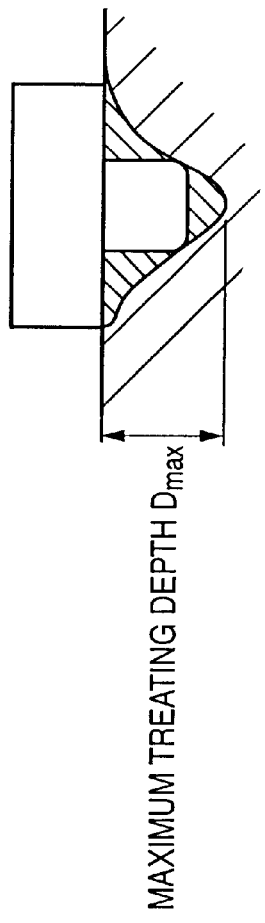
FIG. 8C is a diagram showing a maximum treating depth $D_{max}$.
Figure 8B:
FIG. 8B is a diagram showing the length of tip pin PL.

FIG. 8A is a graph showing a treating depth with respect to a protrusion length, FIG. 8B is a diagram showing a protrusion depth PL, and FIG. 8C is a diagram showing a maximum treating depth $D_{max}$. FIG. 9 is a chart showing a treating depth which is in accordance with the number of revolution and the feed rate of the rotating tool.

In this embodiment, the protrusion length PL is set to be 80 to 90% of a desired depth. The desired depth becomes 1.1 to 1.2 times the length of the protrusion length and is capable of being set from (0) to 10 mm. And as shown in FIG. 8A, the maximum treating depth $D_{max}$ becomes greater proportionally to the protrusion length PL (1.1 to 1.2 times the length of the protrusion), and a maximum treating width also becomes greater proportionally with a diameter of the protrusion. Further, as shown in FIG. 9, the maximum treating depth $D_{max}$ is determined by the protrusion length PL and seems to be little affected by the number of revolution and the feed rate. Still further, variations in the maximum treating depth become smaller compared with the variations caused by the remelt treatment exemplified in FIG. 9, so that the high reliability can be achieved.

As in the case of this embodiment where the space between valves of the cylinder head is subjected to the surface treatment under the condition that the maximum compression pressure, in a combustion chamber, is at maximum level of the order of 150 kgf/cm$^2$, it is preferable to set the number of revolution of the rotating tool at 1200 to 2400 rpm, the feed rate at 30 to 150 mm/min., and the maximum treating depth $D_{max}$ at 4 mm or more after the finish processing (machining width of 1 mm or less), taking its productivity into consideration.

Figure 10:
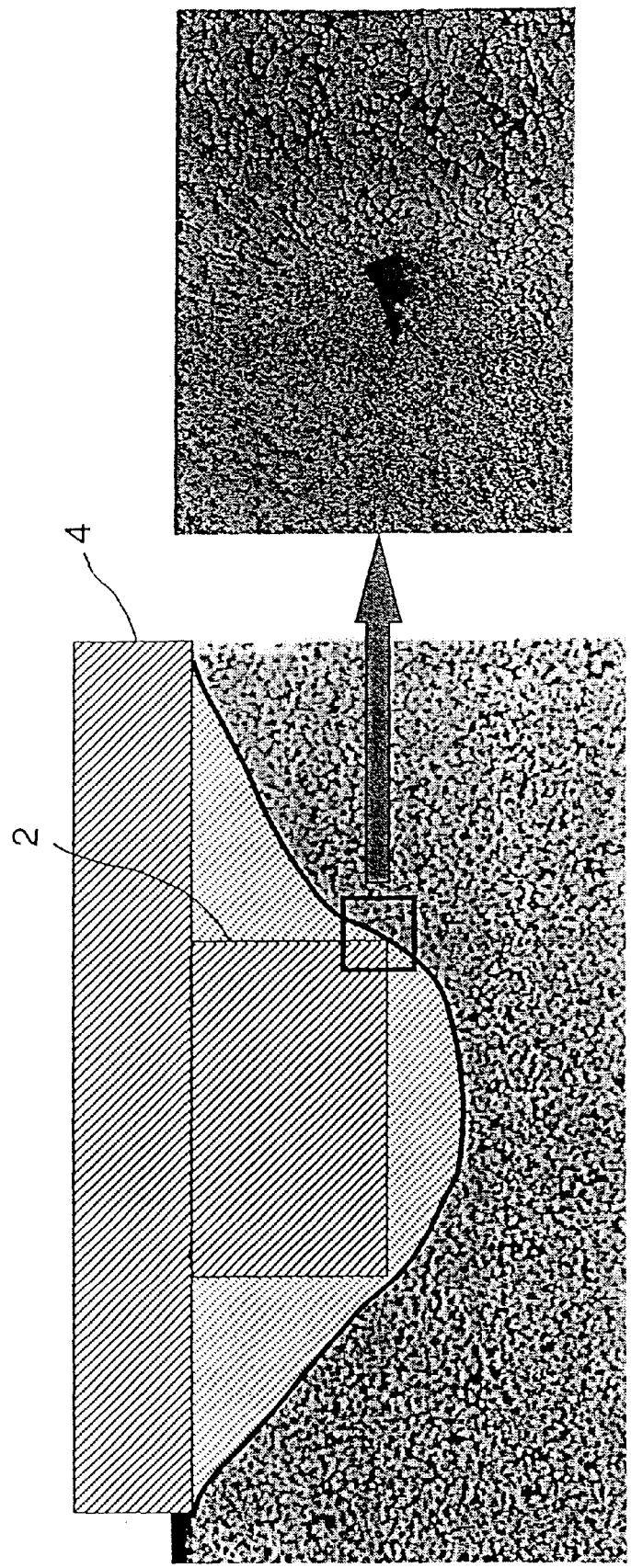
FIG. 10 is a diagram showing an example of unfilled defects.
Figure 11:
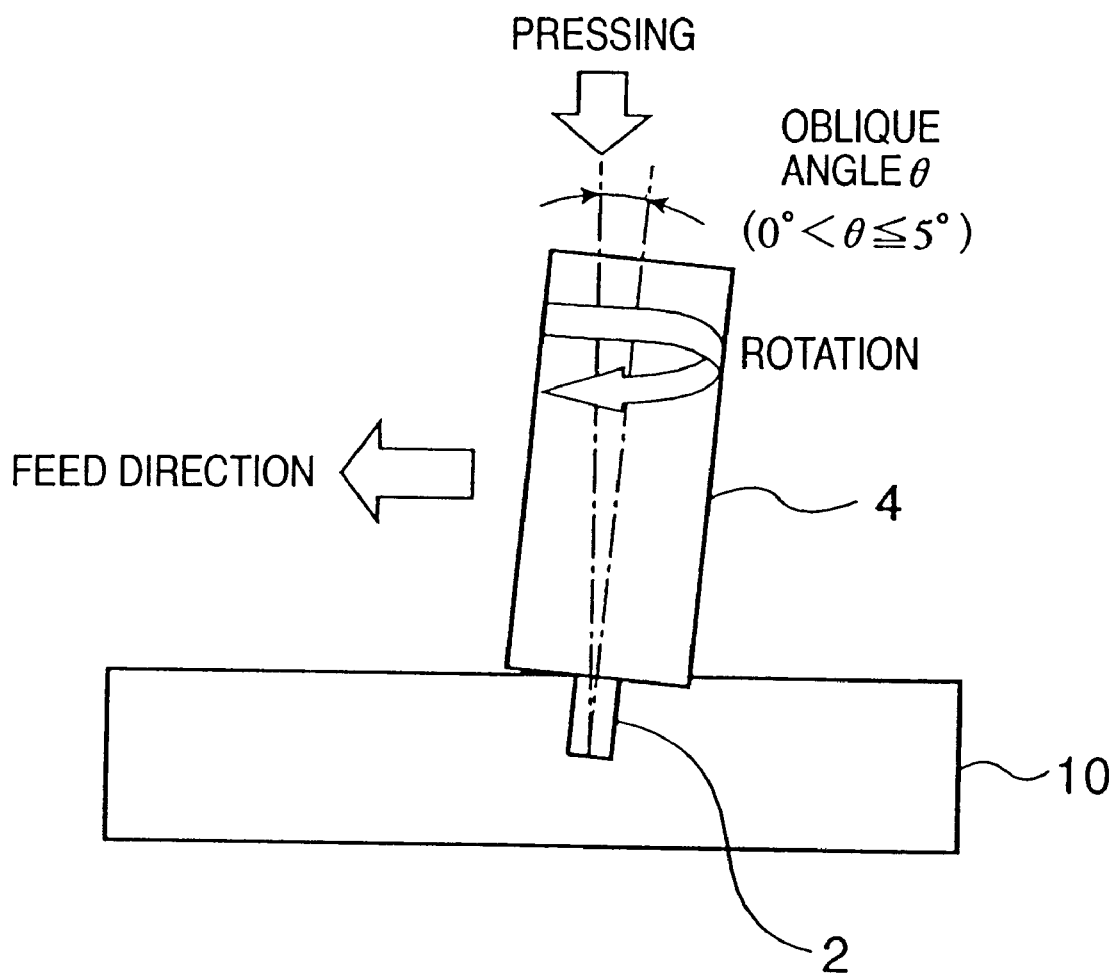
FIG. 11 is a diagram showing an oblique angle of the pin-like tool.

FIG. 10 is a diagram showing an example of an unfilled defect. FIG. 11 is a diagram showing an oblique angle of the rotating tool.

Under the above described condition, when the rotating tool is positioned perpendicular to the surface to be treated (the oblique angle θ is 0°), it is difficult to prevent the unfilled defects from developing in the vicinity of corners of the rotating tool as shown in FIG. 10. In addition, when the oblique angle θ is 5° or more, a deep groove is unfavorably formed in the surface treated by an edge of the shoulder portion 3 of the rotating tool 4, so that lots of burrs are produced to make the surface appearance worse and the machining allowance becomes larger during the finish processing. Therefore, the productivity can be improved with the unfilled defects being suppressed and with the treating depth and the feed rate being increased by means of moving the rotating tool 4 in a situation such that the rotating tool 4 is inclined toward a direction opposite to a feed direction with respect to the surface of an surface treating region in a range of the oblique angle θ of 0°<θ≦5° as shown in FIG. 11.

[Manufacturing Method of Cylinder Head]

A manufacturing process of a cylinder head used for a diesel engine according to an embodiment of the present invention will be described.

Figure 12:
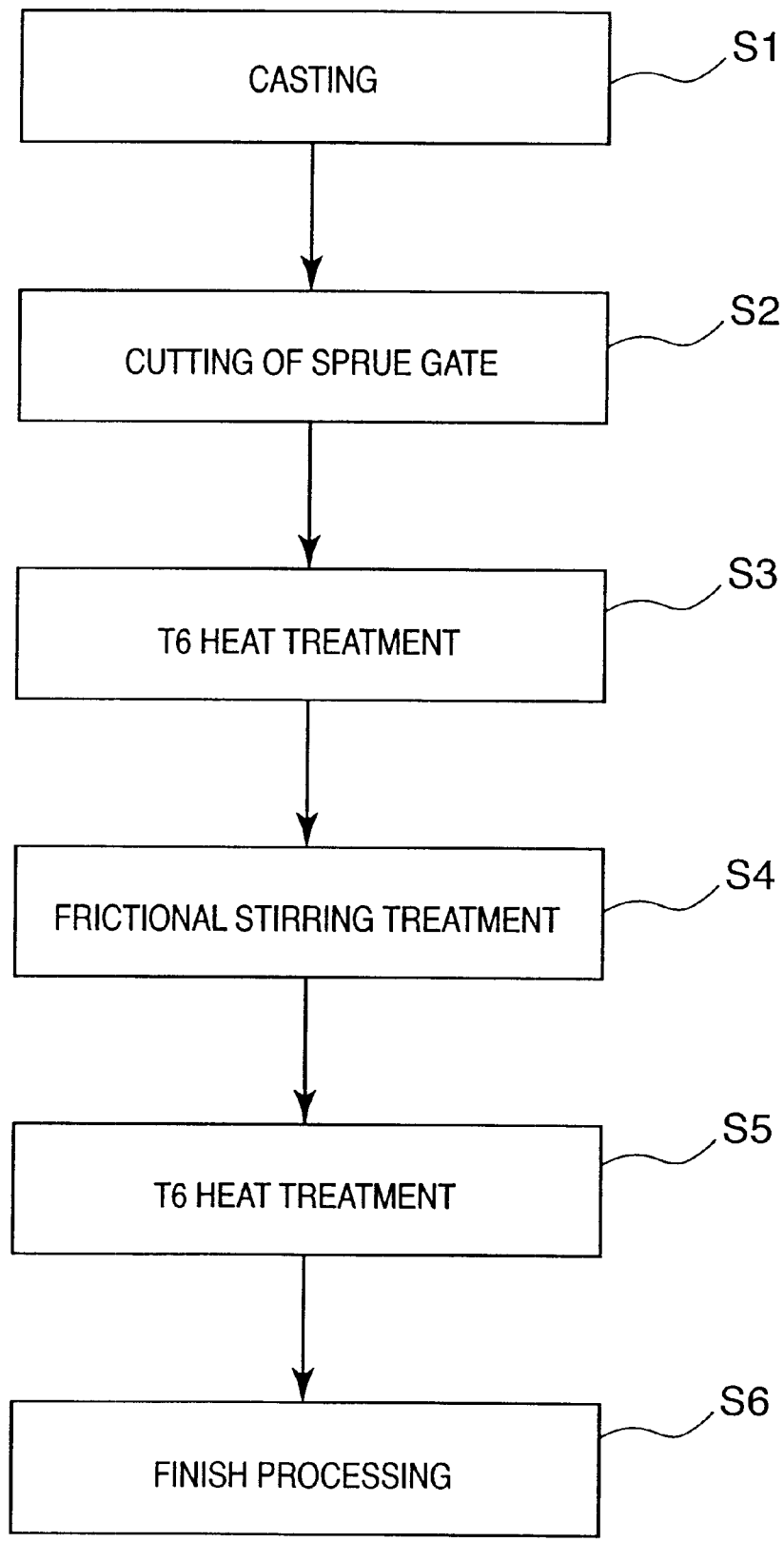
FIG. 12 is a flowchart for describing a manufacturing process of a cylinder head used for a diesel engine of this embodiment.

FIG. 12 is a flowchart for describing the manufacturing process of the cylinder head used for the diesel engine according to this embodiment.

At step S1 the cylinder head as an intermediate is cast from an aluminum alloy as shown in FIG. 12. At step S2, the cast is removed from a casting mold, then a sprue is cut. At step S3, the cast which is removed from the casting mold is subjected to a T6 heat treatment for principally the purpose of sand stripping. At step S4, the space between valves of the cast is subjected to a surface treatment which involves frictional stirring. At step S5, the cast is subjected again to the T6 heat treatment to increase its hardness and strength. At step S6, the finish processing is performed.

Figure 34:
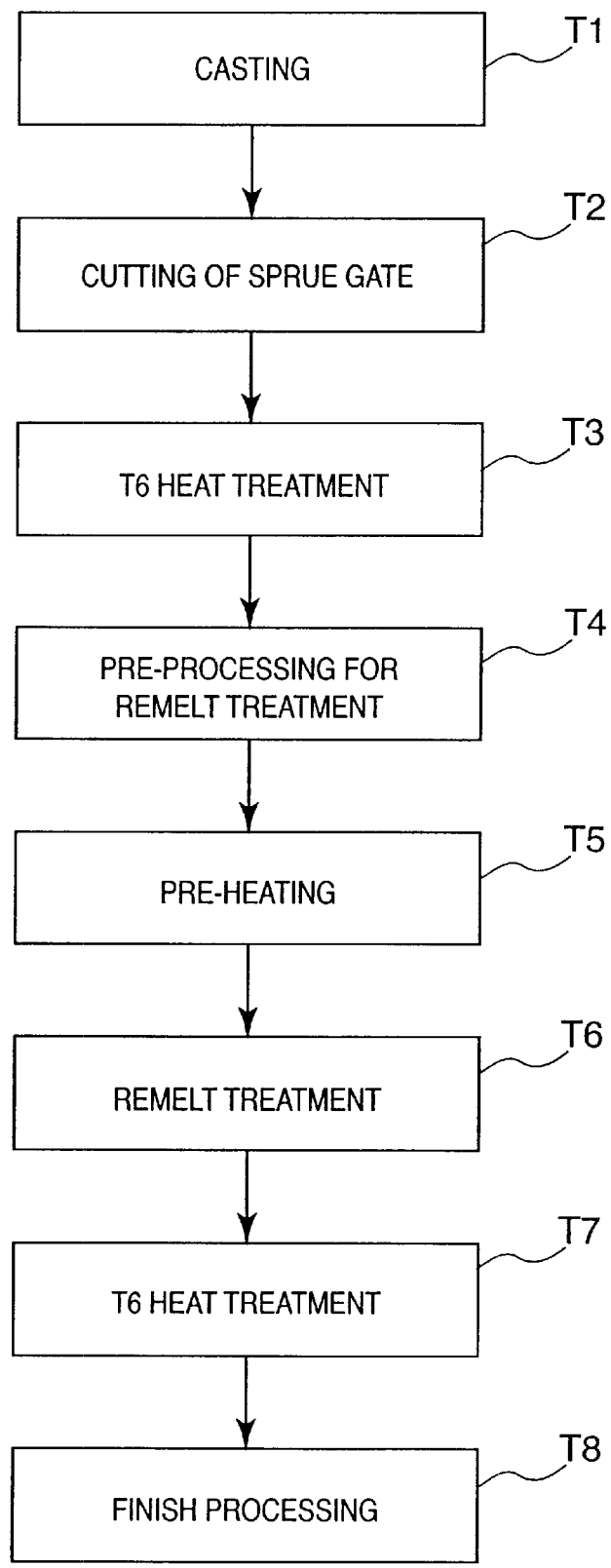
FIG. 34 is a flowchart illustrating a manufacturing process of a cylinder head used for a conventional diesel engine.
Figure 35:
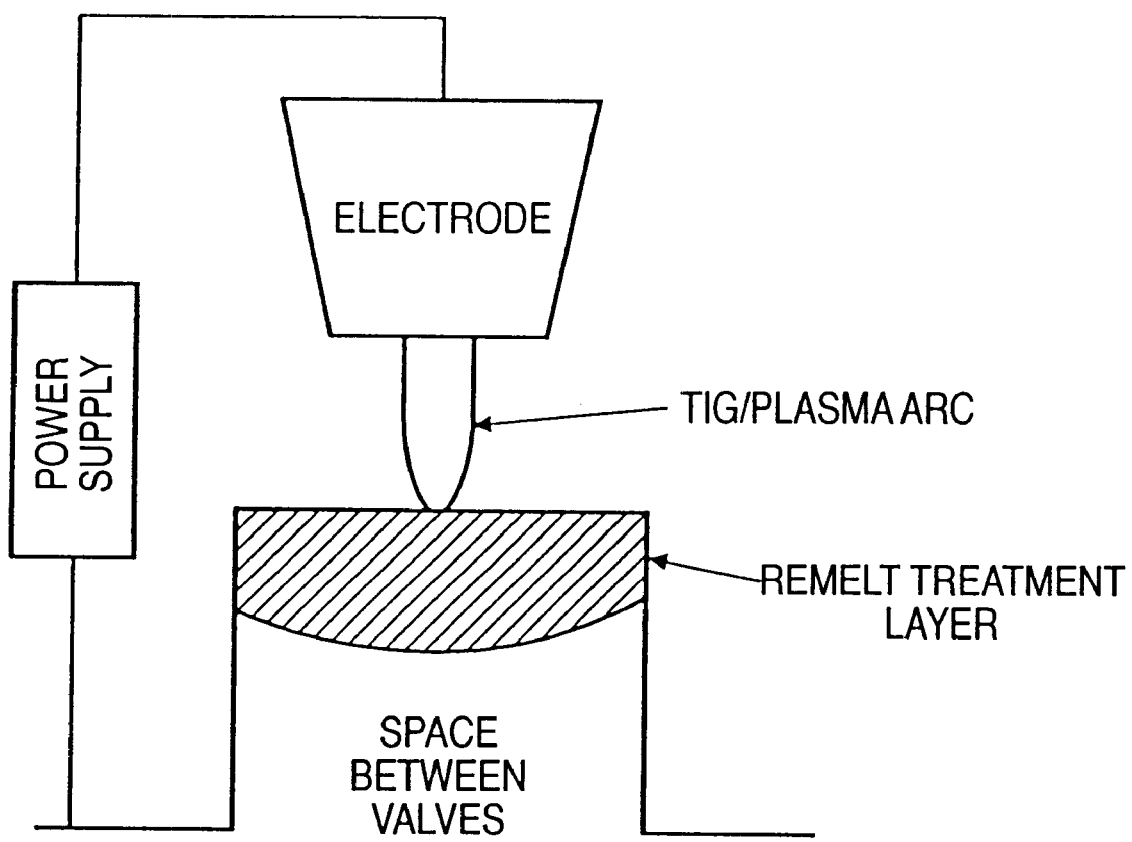
FIG. 35 is a diagram illustrating the outline of the remelt treatment.

The surface treatment which involves frictional stirring as described below eliminates the need for pre-processing of the remelt treatment at step T4, pre-heating of the casting at step T5, and repeated T6 heat treatment shown in FIG. 34, so that the manufacturing process can be simplified and reductions in the manufacturing costs can be achieved compared with the prior art.

[Surface Treatment with Frictional Stirring]

Next, the frictional stirring treatment in FIG. 12 will be described.

<Surface Treatment of the First Embodiment>

FIGS. 13 to 17 are drawings for describing the procedure of the frictional stirring treatment performed on the space between valves, as the first embodiment.

Figure 13:
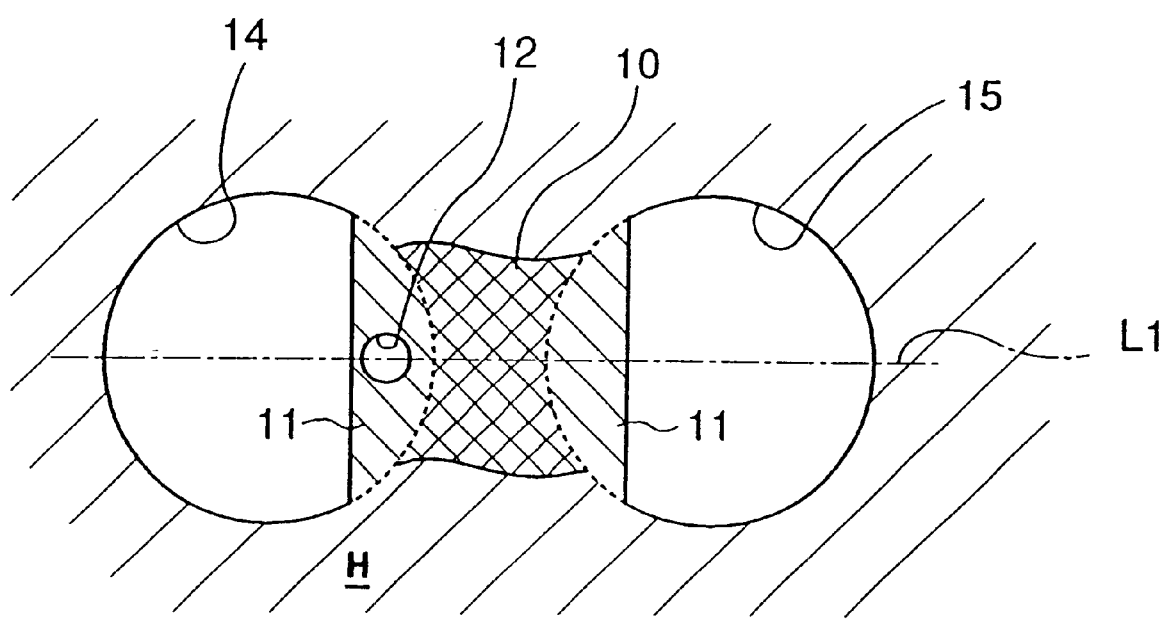
FIG. 13 is a diagram illustrating a surface treating procedure for a space between valves.

As a pre-process of the frictional stirring treatment, when the cylinder head H is cast, at a space between valves 10 along a line L1 connecting a center of an intake port 14 to a center of an exhaust port 15 adjacent thereto, an intermediate having a pads portion 11 and a cored hole 12 is formed on an extended portion of each port as shown in FIG. 13. The cored hole 12 may be processed by a drill or the like after performing the casting and is formed in substantially the same size as that of protrusion 2 so as to be adapted to the diameter and the length of the protrusion 2.

Figure 14:
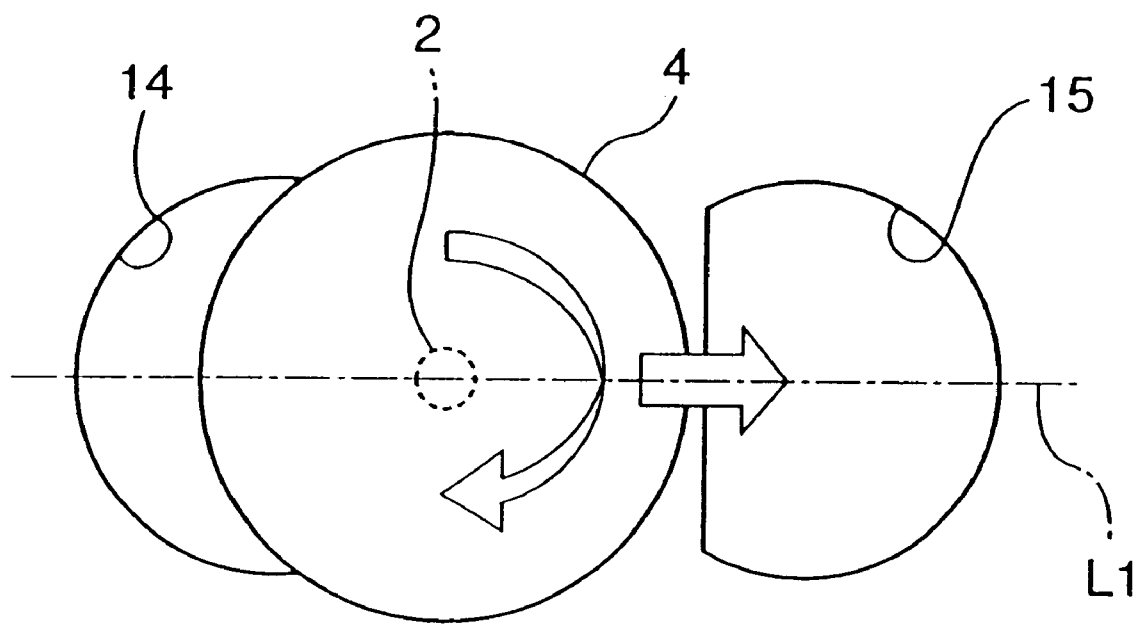
FIG. 14 is a diagram illustrating the surface treating procedure for the space between valves.

Next, positioning is carried out with the protrusion 2 being inserted into the cored hole 12 while being rotatably driving, and at the same time, the shoulder portion 3 of the rotating tool 4 is pressed against the surface of the space between valves 10 in order to determine the treating depth as shown in FIG. 14.

Figure 15:
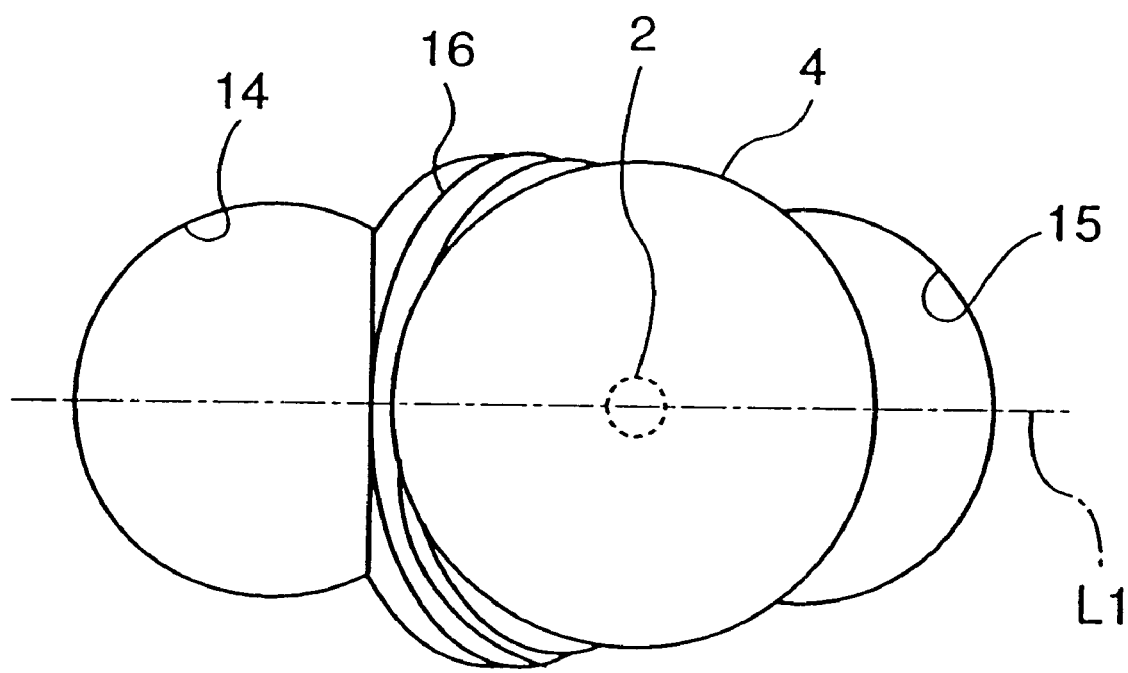
FIG. 15 is a diagram illustrating the surface treating procedure for the space between valves.

Then, the line L1 connecting the centers of the adjacent ports is assumed to be a moving locus of the protrusion 2, and the protrusion 2 is moved by the tool driving means 5 along the moving locus which starts from the cored hole 12 of one pads portion 11 to the other pads portion 11 while stirring by the frictional heat as shown in FIG. 15. At this moment, a circular groove 16 is formed on a surface of the space between valves along the line L1, with the shoulder portion 3 of the rotating tool 4 being pressed against the surface.

Figure 16:
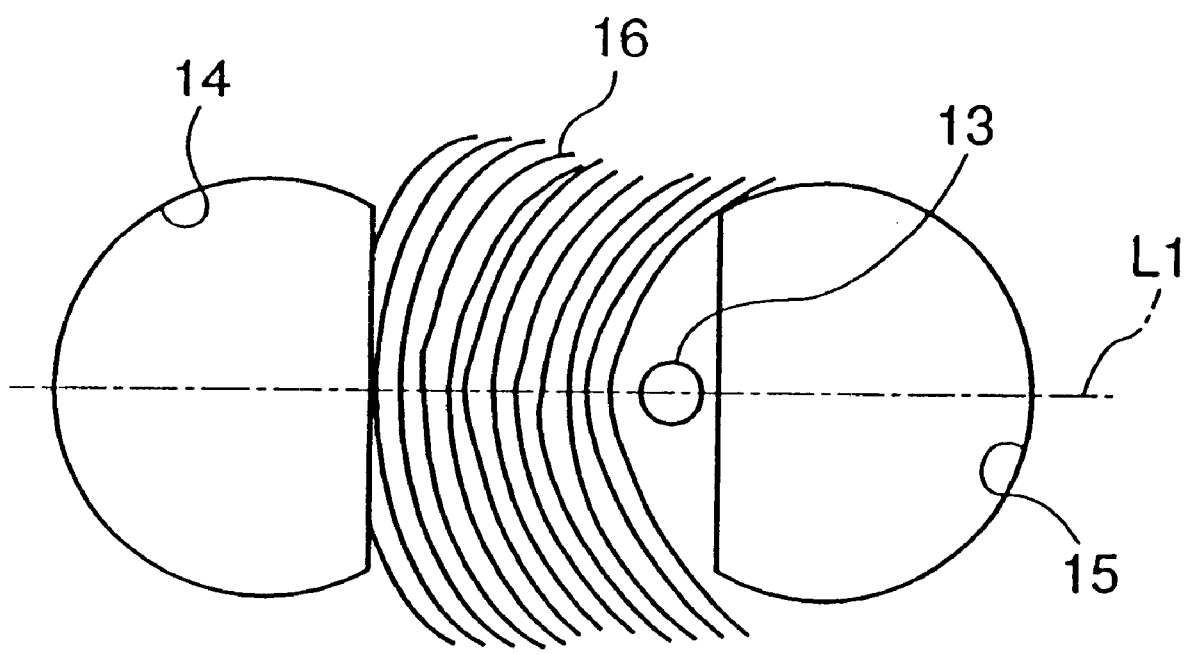
FIG. 16 is a diagram illustrating the surface treating procedure for the space between valves.

Further, the protrusion 2 is moved to the other pads portion 11 before detaching it from the space between valves 11 as shown in FIG. 16. At this moment, a terminal hole 13 is formed in the other pads portion 11 as an terminal point of the protrusion 2.

Figure 17:
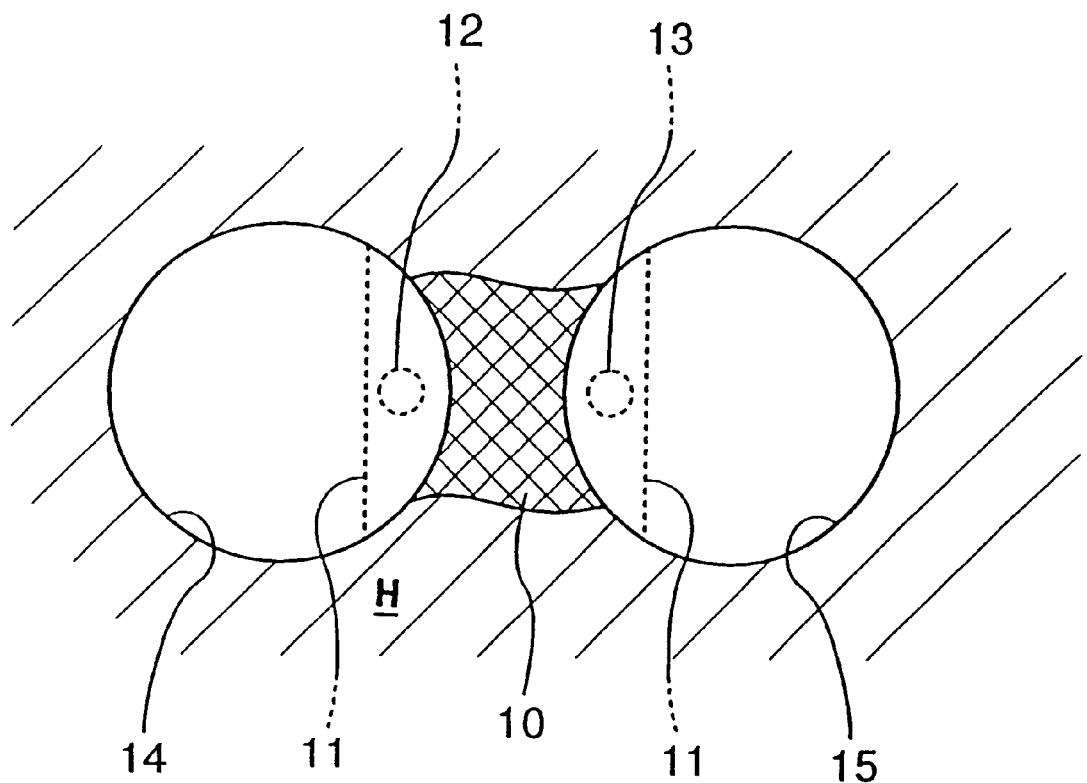
FIG. 17 is a diagram illustrating the surface treating procedure for the space between valves.

Finally, the pads portions 11 are eliminated and the finish processing is carried out for the intake port 14 and the exhaust port 15 as shown in FIG. 17.

Figure 18A:
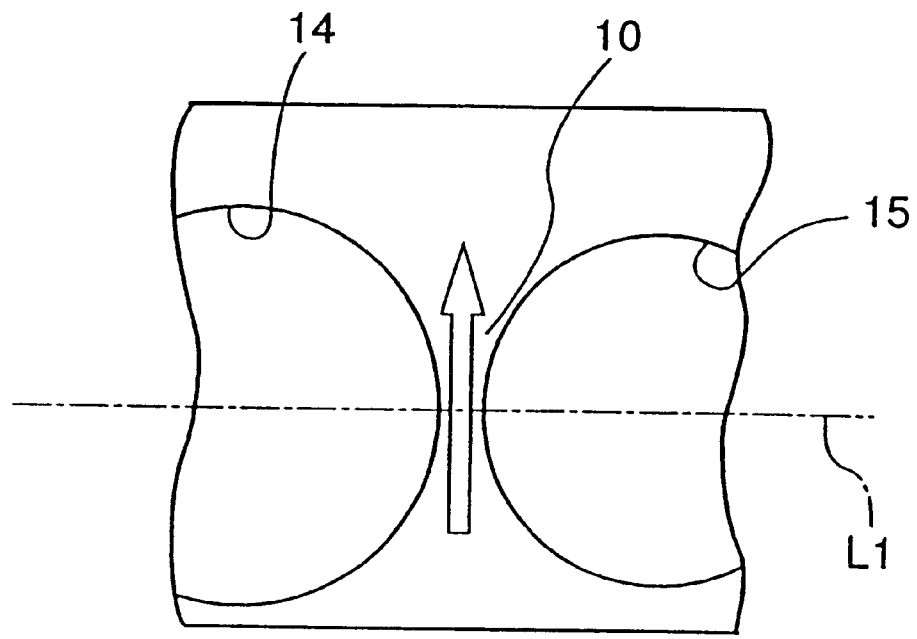
FIG. 18A is a diagram showing a treating direction at the space between valves caused by a remelt treatment.
Figure 18B:
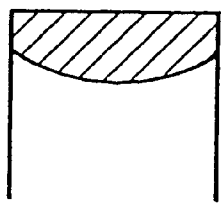
FIG. 18B is a cross-sectional view showing a treating depth caused by the treating direction in FIG. 18A.
Figure 19A:
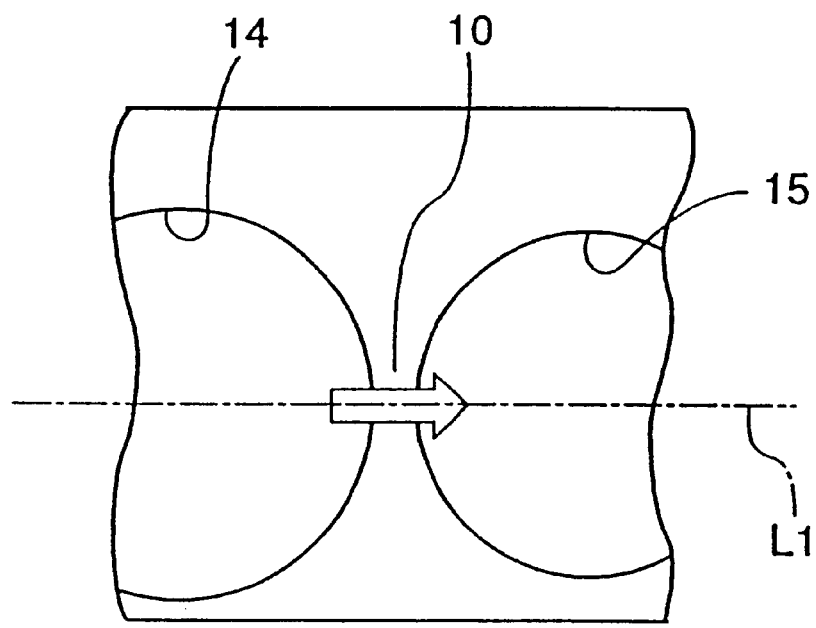
FIG. 19A is a diagram showing a space between valves and a treating direction caused by a frictional stirring treatment of this embodiment.
Figure 19B:
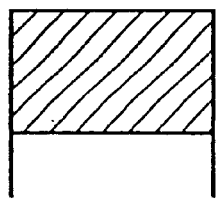
FIG. 19B is a cross-sectional view of a treating depth caused by the treating direction in FIG. 19A, seen from a direction perpendicular to a moving locus of the pin-like tool.
Figure 20:
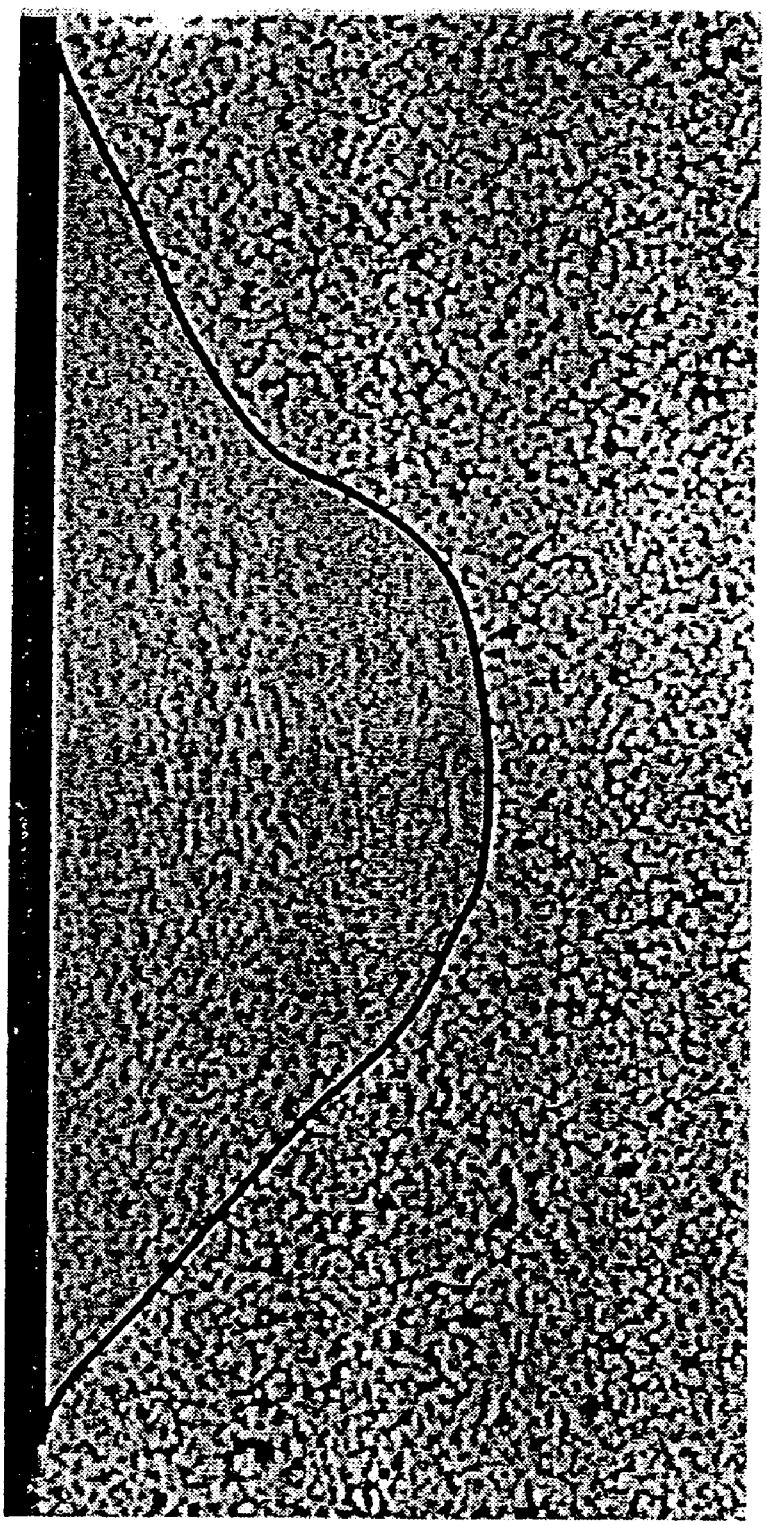
FIG. 20 is a cross-sectional view of the treating depth at the space between valves caused by the frictional stirring treatment of this embodiment, seen from a direction parallel to the moving locus of the pin-like tool.

FIG. 18A is a diagram showing a treating direction of the space between valves caused by the remelt treatment, and FIG. 18B is a cross-sectional view showing a treating depth caused by the treating direction in FIG. 18A. FIG. 19A is a diagram showing a space between valves and the treating direction caused by the frictional stirring treatment according to this embodiment, and FIG. 19B is a cross-sectional view of the treating depth caused by the treating direction in FIG. 19A, seen from a direction perpendicular to the moving locus of the rotating tool. FIG. 20 is a cross-sectional view of the treating depth at the space between valves caused by the frictional stirring treatment of this embodiment, seen from a direction parallel to the moving locus of the protrusion.

In the above described surface treatment, assuming the line L1 connecting between the centers of the adjacent intake port 14 and exhaust port 15 as a moving locus of the protrusion 2 and moving across the space between valves 10 in the shortest distance, the treatment is performed in a direction such that the cracks occur in the space between valves 10 as shown in FIGS. 19A, 19B, and 20. Therefore, the treating depth at the space between valves 10 can be easily increased compared with the case of the remelt treatment wherein the treatment is performed perpendicular to a direction in which the cracks occur in the space between valves as shown in FIGS. 18A and 18B. In addition, the moving locus of the protrusion 2 is capable of being set not only along the line L1 connecting between the centers of adjacent ports but also at a region wherein the other cracks easily occur.

Figure 21B:
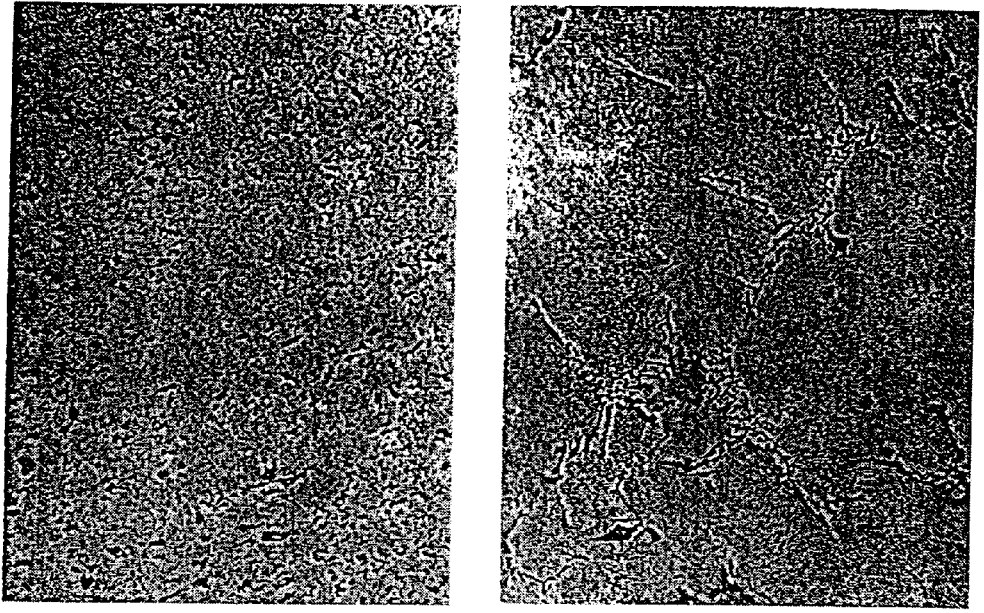
FIG. 21B is a cross-sectional view showing the metal texture and the base material in FIG. 21A separately.
Figure 21A:
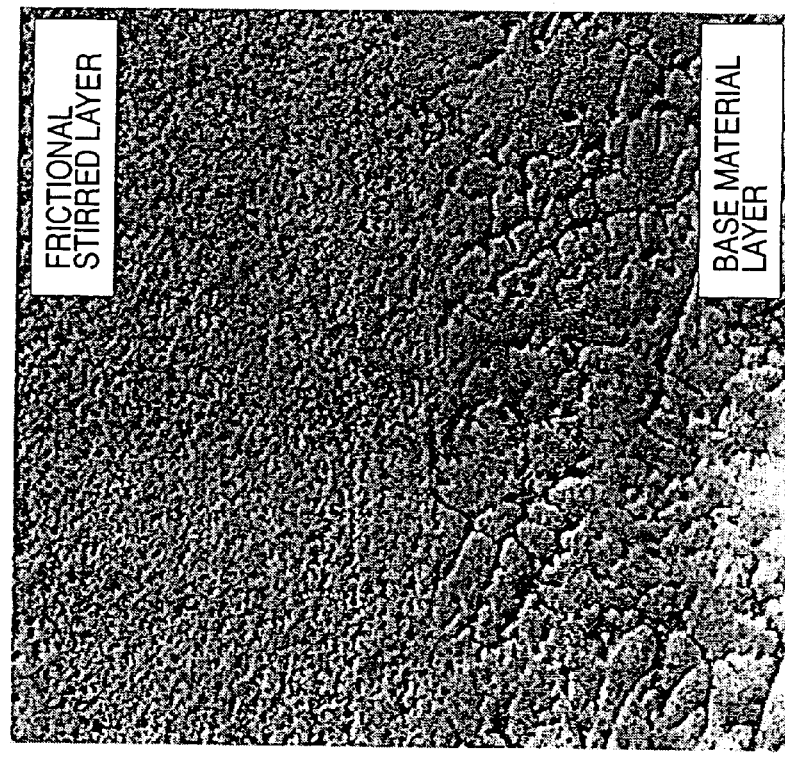
FIG. 21A is a cross-sectional view of a metal texture and a base material being subjected to the surface treatment of this embodiment.
Figure 22B:
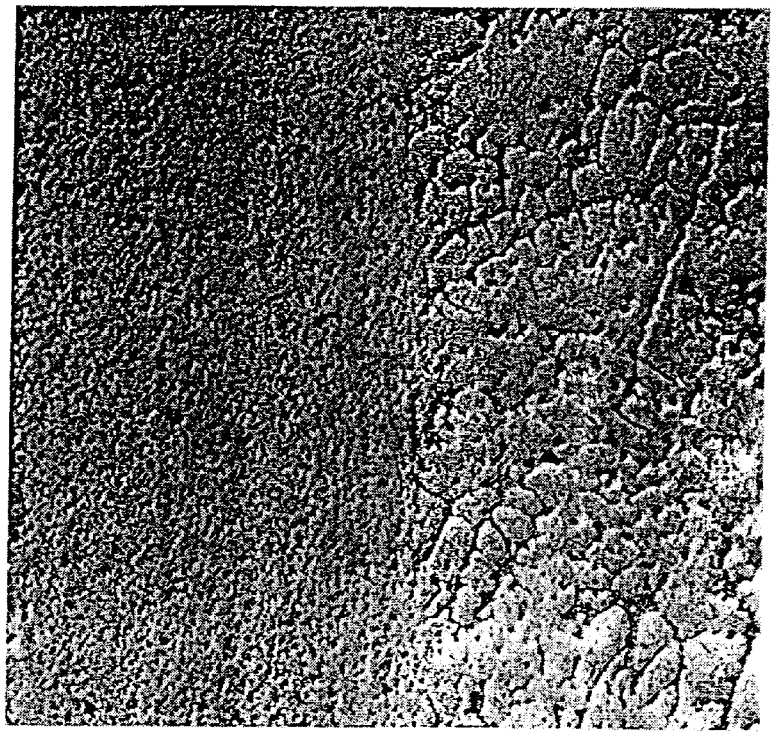
FIG. 22B is a cross-sectional view showing the metal texture subjected to the remelt treatment.
Figure 22A:
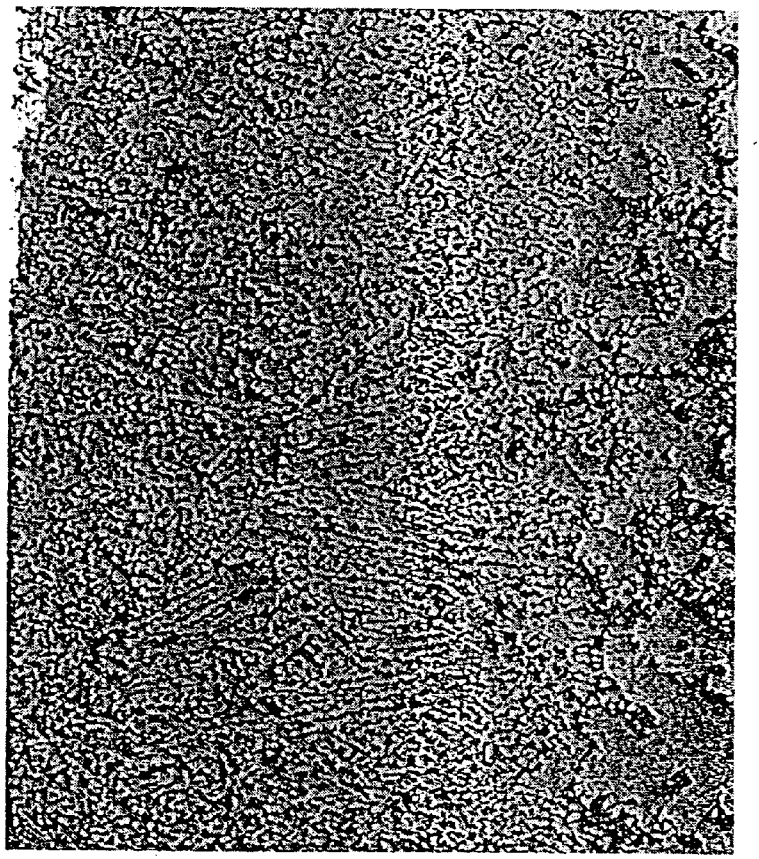
FIG. 22A is a cross-sectional view showing the metal texture subjected to the surface treatment of this embodiment.

FIG. 21A is a cross-sectional view of a metal texture and a base material being subjected to the surface treatment according to this embodiment, and FIG. 21B is a cross-sectional view showing the metal texture and the base material in FIG. 21A separately. FIG. 22A is a cross-sectional view showing the metal texture subjected to the surface treatment according to this embodiment, and FIG. 22B is a cross-sectional view showing the metal texture subjected to the remelt treatment.

As shown in FIGS. 21A and 21B, performing the surface treatment through the frictional stirring provides uniform dispersion of fine eutectic silicon and formation of the metal texture without vacancy defects. And as shown in FIGS. 22A and 22B, a fine metal texture which is of the same level as that obtained by the remelt treatment can be formed.

<Surface Treatment of the Second Embodiment>

Figure 23:
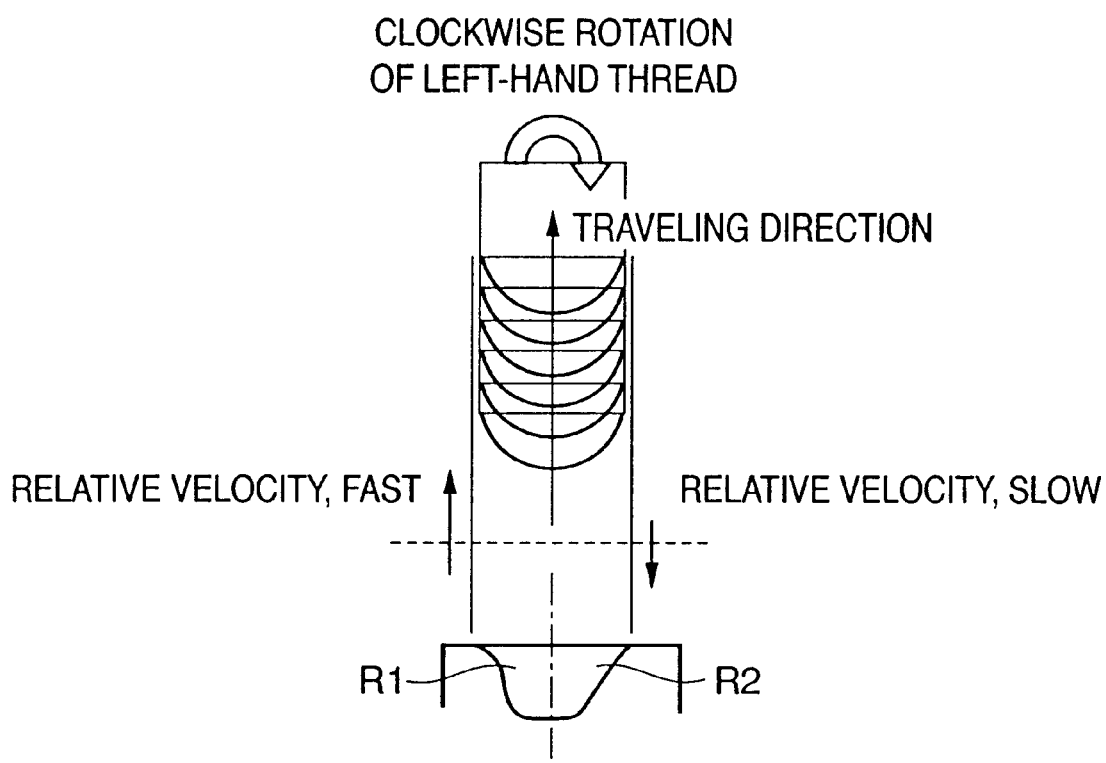
FIG. 23 is a diagram illustrating a characteristic of a frictional stirring treatment of a second embodiment according to the present invention, showing a traveling direction of the rotating tool and a cross-section of a treating region in a material.

As shown in FIG. 23, a treating region cross section created by a rotating tool whose protrusion shape is a left-handed thread type which is rotated clockwise is stirred so that the material is pressed against its inside with the protrusion of this tool being centered in the region. Therefore, with respect to the rotating direction of this tool, at a portion in which the material flows in the same direction as the travel of the rotating tool, a treating depth in which the plastic flow is produced at a shallow position becomes shallow, so that the cross section of that portion becomes a region R1 having a small sectional area. On the other hand, at a portion in which the material flows in a direction opposite to the travel of the rotating tool, a treating depth in which the plastic flow is produced at a deep position becomes deep, so that the cross section of that portion becomes a region R2 having a large sectional area. The difference between these regions R1 and R2 is assumed to be a result of the material being stirred faster since the relative velocities between the rotating tool and the material become fast in a direction which is the same as the rotating direction of the tool, while the material is stirred slower since the relative velocities between the rotating tool and the material become slow in a direction opposite to the rotating direction of the tool.

In this case, the protrusion shape of the rotating tool is not limited to this thread type, but a spherical type (FIG. 4) or a cylindrical type (FIG. 5) is also applicable to the protrusion.

Figure 24:
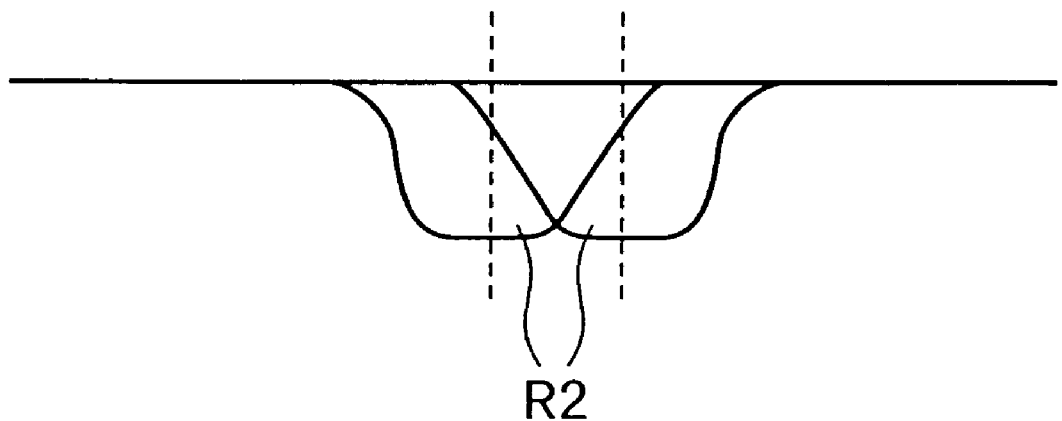
FIG. 24 is a diagram showing a cross-section of a treating region of a material obtained by a first treating pattern in the frictional stirring treatment according to the second embodiment.
Figure 25:
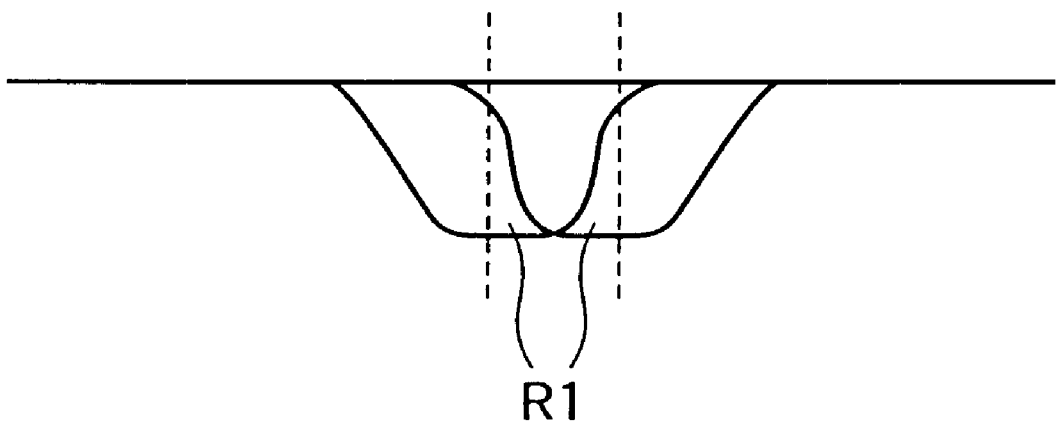
FIG. 25 is a diagram showing a cross-section of a treating region of a material caused by a second treating pattern in the frictional stirring treatment according to the second embodiment.
Figure 26:
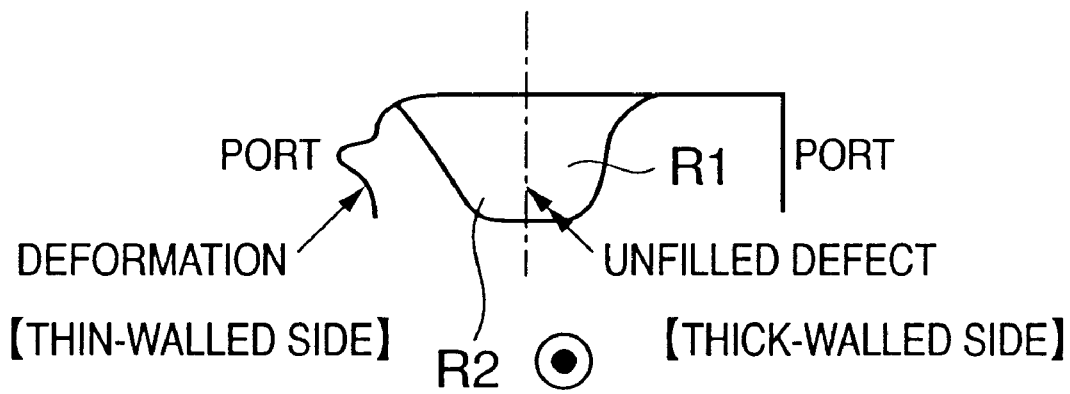
FIG. 26 is a diagram illustrating an unfavorable example in case of treating a port edge.
Figure 27:
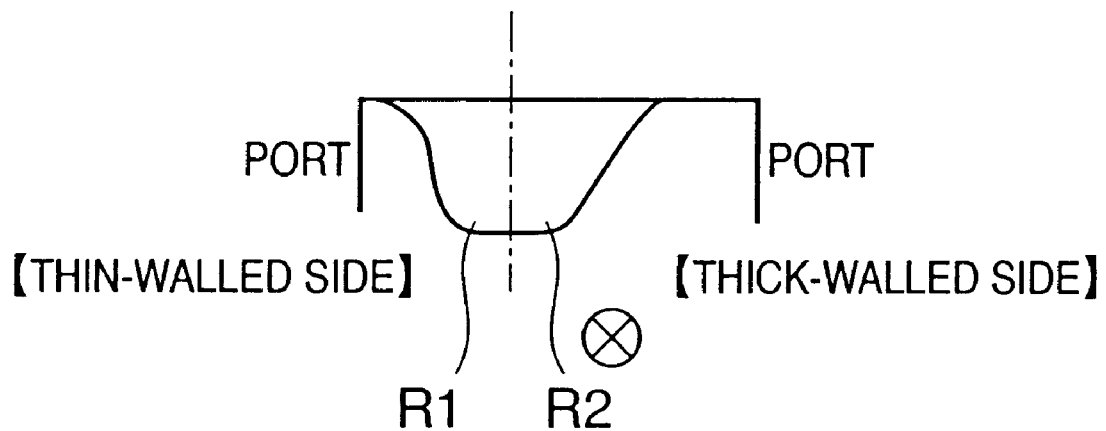
FIG. 27 is a diagram illustrating a good example in case of treating a port edge.

The frictional stirring treatment of the second embodiment, utilizing this characteristics, achieves the proper use of the first treating pattern wherein a plurality of treating paths (for example, forward and backward paths) are set so that the treating depths become substantially uniform by overlapping the regions R2 in which the plastic flows are produced at shallow positions as shown in FIG. 24, and the second treating pattern wherein, opposed to the first treating pattern, the material is prevented from flowing out by overlapping the regions R1 in which the plastic flows are produced at deep positions to control the treating depths as shown in FIG. 25. In this way, a large region can be treated with the rotating tool having a small protrusion, and also, in the first treating pattern, when the surface treatment of the cylinder head is performed on a region which is positioned as close as possible to a port end, the deformation of the port end shown in FIG. 27 can be avoided by the treatment which is performed so that the small region R1 is positioned at a thin-walled side of the port end as shown in FIG. 26. Further, in the first and second treating patterns, the overlapping is performed so that the maximum treating depths become substantially the same levels, and an indentation of the shoulder portion of the rotating tool into the material is determined.

On the other hand, a disadvantage of the surface treatment which uses a rotating tool having a protrusion is that the terminal hole created by the protrusion is left at a terminal point of the treating path. In addition, the defects easily occur at a start point of the treatment, so that the treating path is set such that the path passes through the start point in order to solve this problem. Further, if the treatment is performed on a surface of a cast which is subjected to the perforating for bolts used for the cylinder head or the like in a post-process, the terminal point of the treating path is set at a position on which the perforation is performed by the use of a protrusion having a diameter smaller than the hole produced by the perforating. In this way, it becomes possible to prevent the terminal holes from remaining on the product.

Next, the surface treatment of the cylinder head of the straight-type multi-cylinder diesel engine which employs the frictional stirring treatment of the second embodiment will be described.

Figure 28:
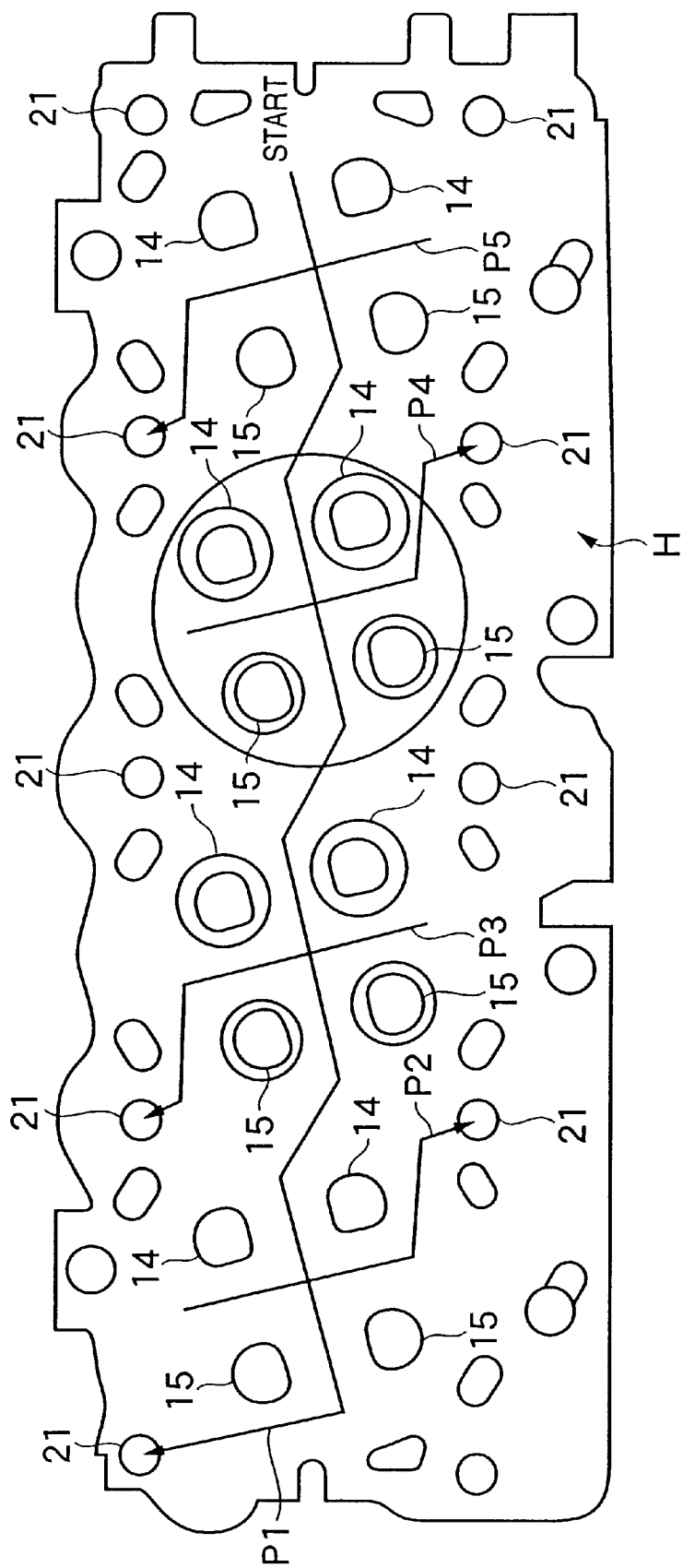
FIG. 28 is a diagram showing an example of treating paths which are caused by a surface treatment of a cylinder head of a straight-type of multi-cylinder diesel engine employing the frictional stirring treatment according to the second embodiment.

As shown in FIG. 28, the cylinder head H has pairs of intake ports 14, pairs of exhaust ports 15, and a plurality of tension bolt holes 21 for fastening to a cylinder block which is not shown in this figure, corresponding to a plurality of cylinders. In this case, there is a need for providing larger intake ports in order to increase an intake capacity, so that an area between adjacent intake ports become narrower and becomes a thin-walled portion. The frictional stirring treatment of the second embodiment is particularly effective for a treatment of such a site.

And as an example of treating paths, as shown in FIG. 28, via a first path P1 which extends for continuous treatment from one longitudinal end to the other of a cylinder head H passing between pairs of exhaust ports 15 and pairs of intake ports 14 opposed to each other with respect to one cylinder and which terminates in a tension bolt hole 21, and via second paths P2 to P5 which, after treatment by this first path P1, extend for successive treatment from cylinders adjacent the terminal point of the first path P1 and between a pair of exhaust ports 15 and a pair of intake ports 14 opposed to each other and which terminate in tension bolt holes 21, the surface of the cylinder head H is stirred for refining without melting it by the heat from a rotating tool.

Figure 29:
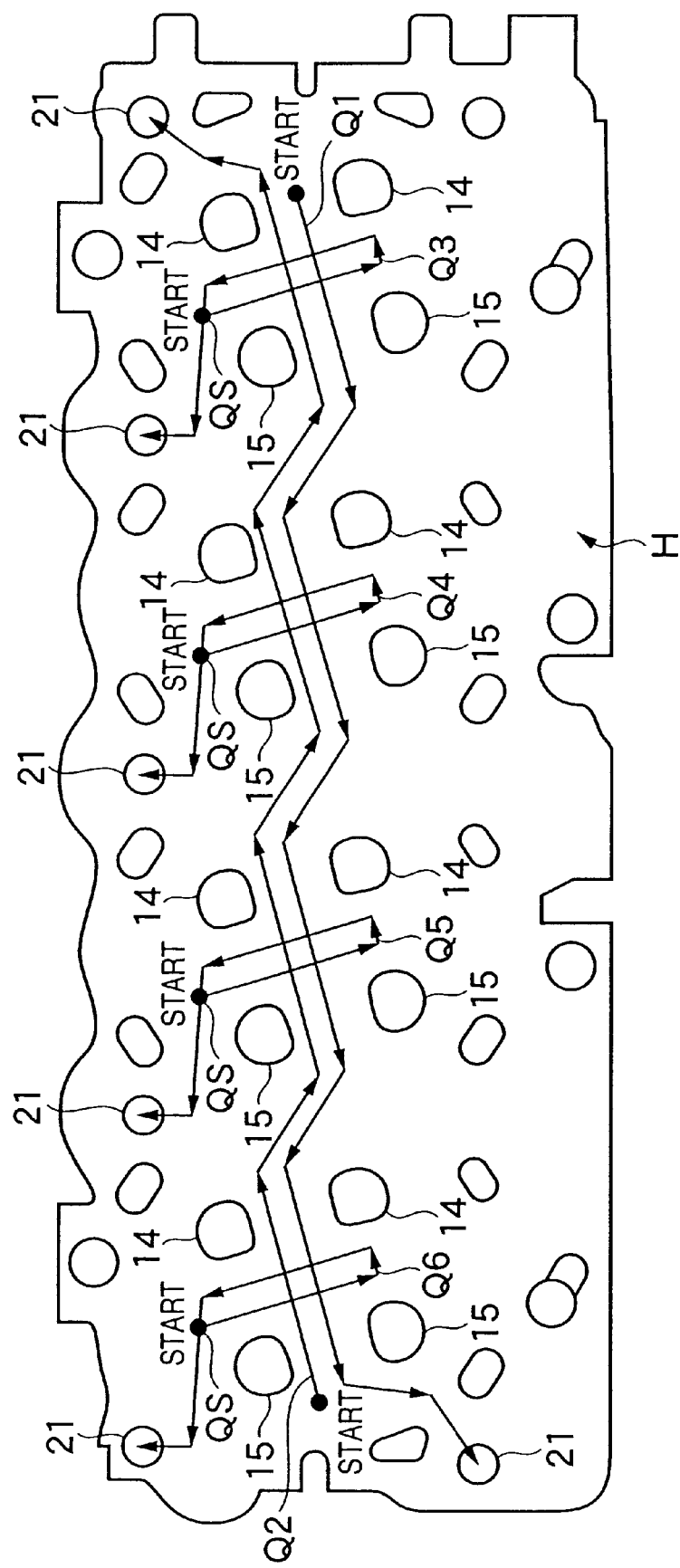
FIG. 29 is a diagram showing an another example of treating paths which are caused by the surface treatment of the cylinder head of the straight-type of multi-cylinder diesel engine employing the frictional stirring treatment according to the second embodiment.

As another example of treating paths concerning the above described first treating pattern, as shown in FIG. 29, via a first forward path Q1 which extends for continuous treatment from one longitudinal end to the other of a cylinder head H passing between pairs of exhaust ports 15 and pairs of intake ports 14 opposed to each other with respect to one cylinder and which terminates in a tension bolt hole 21, via a first backward path Q2 which extends for continuous treatment from the other longitudinal end to one longitudinal end of the cylinder head H passing between pairs of exhaust ports 15 and pairs of intake ports 14 opposed to each other in parallel with and in the opposite direction to this first forward path Q1 and which terminates in a tension bolt hole 21, and via second forward and backward paths Q3 to Q6 which, after treatment by this first backward path Q2, extend for successive treatment from cylinders adjacent the terminal point of the first backward path Q2 and travel in forward and backward directions between a pair of exhaust ports 15 and a pair of intake ports 14 opposed to each other so that backward paths are passing through start points Qs of forward paths and which terminate in tension bolt holes 21, the surface of the cylinder head H is stirred for refining without melting it by the heat from a rotating tool.

Figure 30:
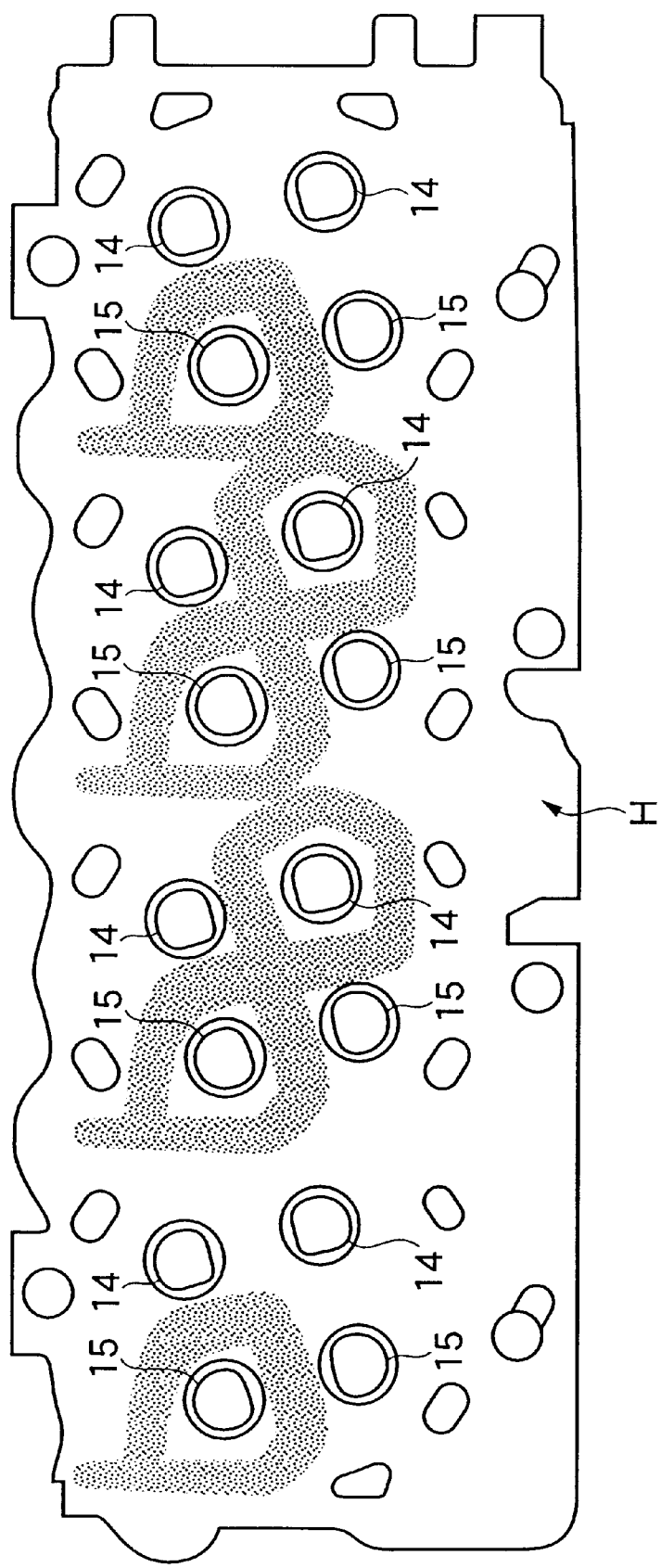
FIG. 30 is a diagram showing an example of a surface treatment of a cylinder head of a straight-type of multi-cylinder diesel engine employing a conventional remelt treatment.

In this way, only the required site of a large region can be treated by setting the treating paths for the cylinder head H, so that the residual stress can be reduced and the treating time can also be decreased. On the other hand, if a region between the ports 14 and 15 is subjected to the remelt treatment so that the region becomes shaped as shown in FIG. 8 and FIG. 30, substantially the whole area between the ports 14 and 15 is required to be treated.

Further, the deformation of the material can be suppressed since the treating time can be decreased. On the other hand, although the treating path becomes shorter if the remelt treatment is performed so that the above described region becomes the shape of the FIG. 8, the deformation of the material easily occurs because the path passes in the vicinity of the ports.

Still further, the forward and backward paths have an advantage of causing little deforming of the material because the temperature distribution of the material at the forward path is different from that of the material at the backward path. If the treatment is performed such that the above described region becomes the shape of the FIG. 8, the material is easily deformed because the material resistance at a portion in which the treating regions are overlapped decreases.

In the above described surface treatment of the cylinder head, the rotating tool is preferably set under the conditions such that an oblique angle θ is 0°, the number of revolution is 600 to 1000 rpm, the feed rate is 300 to 500 mm/min., a length of the protrusion is 5.8 mm, the diameter of the protrusion is 7±1 mm, the diameter of the shoulder portion is 15±1 mm in order to obtain a treating depth of 6 to 6.5 mm, the treating width of the first path of 7.5 to 8 mm, and the treating width of the second path of 15 mm. In this case, an each size of the diameters of the protrusion and the shoulder portion is set to be in a relation of 2≦shoulder portion/protrusion<4. In addition, the indentation of the shoulder portion into the treating surface of the material is set to be 1 mm or less.

[Heat Treatment after the Surface Treatment]

Figure 31:
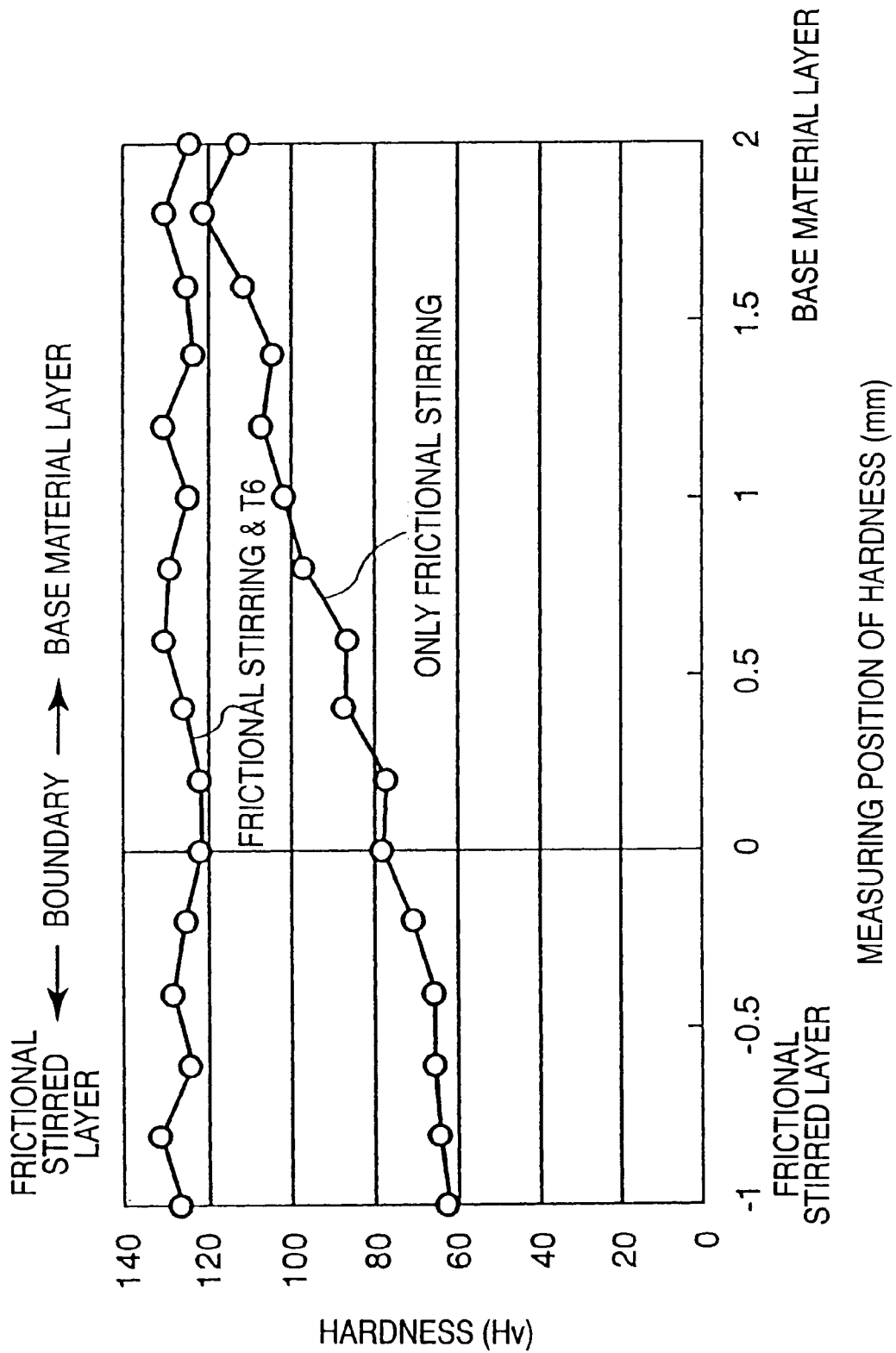
FIG. 31 is a graph showing a comparison of a hardness in case of being subjected to a T6 heat treatment with a hardness in case of not being subjected to the T6 heat treatment, both of which are previously subjected to the surface treatment by stirring.
Figure 32:
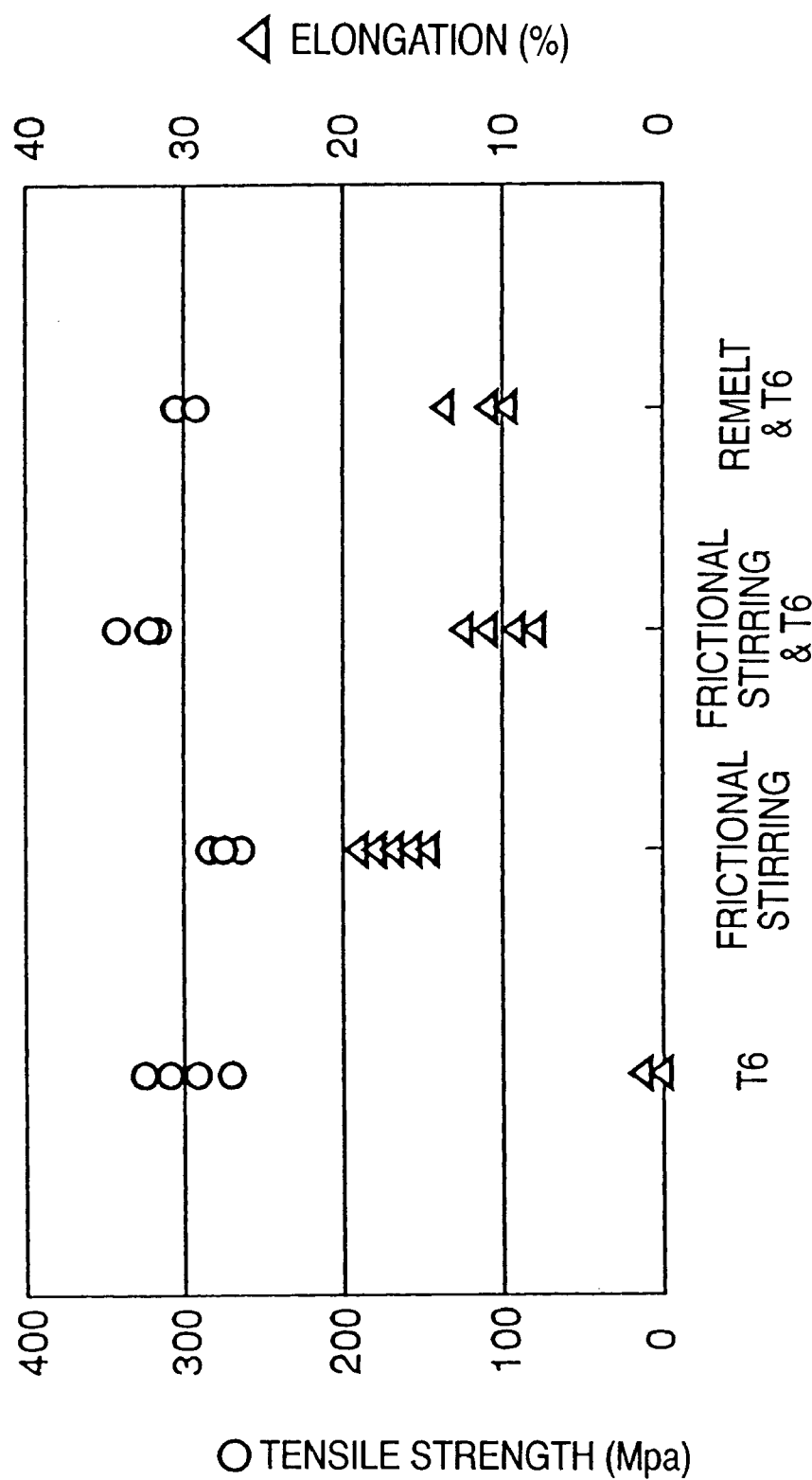
FIG. 32 is a chart showing comparisons of tensile strengths and elongation characteristics in case of being subjected only to the T6 heat treatment, in case of being subjected to the T6 heat treatment after the surface treatment by stirring, and in case of being subjected to the T6 heat treatment after the remelt treatment, respectively.
Figure 33:
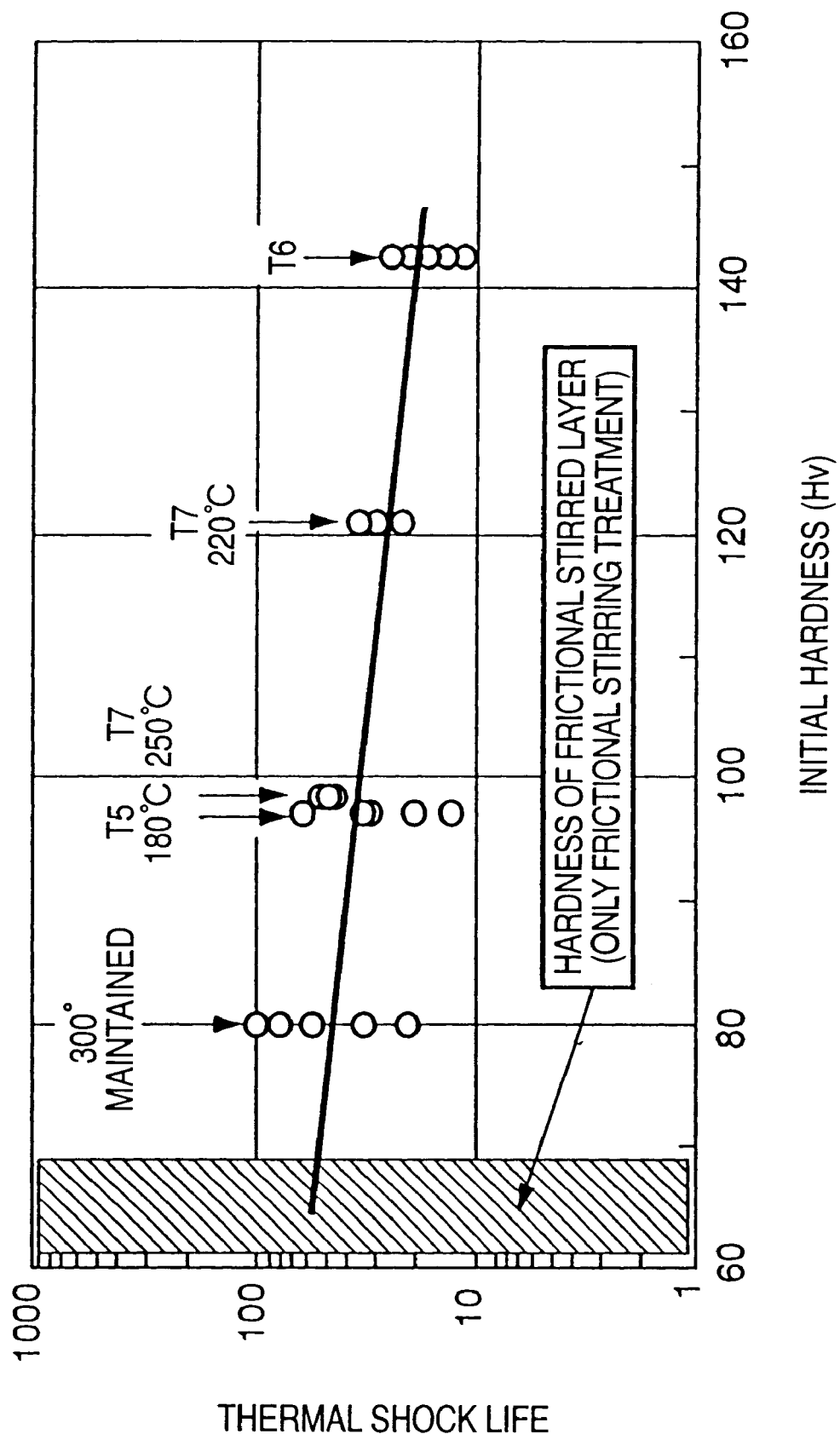
FIG. 33 is a graph showing a relation between an initial hardness and a thermal fatigue life which varies depending on different heat treatments.

FIG. 31 is a graph showing a comparison of a hardness in case of being subjected to a T6 heat treatment with a hardness in case of not being subjected to the T6 heat treatment, after being subjected to the surface treatment through stirring. FIG. 32 is a diagram showing a comparison of a mechanical characteristic in case of being subjected to only the T6 heat treatment, in case of being subjected to the T6 heat treatment after the surface treatment through stirring, and in case of being subjected to the T6 heat treatment after the remelt treatment. FIG. 33 is a graph showing a relation between an initial hardness and a thermal fatigue life which varies depending on different heat treatments.

When the heat treatment is performed before the finish processing, in addition to the above described surface treatment through stirring, the hardnesses (Hv) of both the surface treating texture and the underlying base material layer can be increased as shown in FIG. 31. And more excellent tensile strength and elongation characteristic can be obtained even when compared with mechanical characteristics which is in case of being subjected to only the T6 heat treatment, in case of being subjected to the T6 heat treatment after the remelt treatment, and in case of being subjected to only the frictional stirring treatment respectively, as shown in FIG. 32.

Further, the material which is not subjected to the heat treatment has a low initial hardness and an improved elongation characteristic as can be seen from FIG. 33, so that its thermal fatigue life is increased and the strength against the thermal shock also increases. Therefore, it is effective to use this material which was subjected only to the frictional stirring treatment and has an improved elongation characteristic, for the site required to have a high strength against the thermal fatigue.

On the other hand, for the site to which the thermal fatigue is provided combined with the mechanical high cycle fatigue, the frictional stirring treatment and the T6 heat treatment are effectively performed in order to allow the high strength and elongation to be compatible with each other since the strength is needed in addition to the elongation. Further, the T6 heat treatment is also effective for recovering the strength even when the region in the vicinity of the treating texture is softened to reduce its strength under the influence of heat.

As an example of the heat treatment, a T6 heat treatment (a solution heat treatment and an aging treatment) based on the JIS is effective. In the solution heat treatment, the material is kept at a temperature of 535° C. (±5° C.), which is appropriate for this treatment, for four hours and subsequently subjected to hardening which is carried out by the use of boiling water. In the aging treatment, the material is kept at an aging temperature of 180° C. (±5° C.) for six hours and subsequently cooled in air.

Industrial Applicability

As described above, when a surface of a casting which has concave portions is stirred for refining without melting it by the heat from a rotating tool, a treating region can be made deeper while preventing unfilled defects from occurring due to the deformation of the material by performing the surface treatment such that, in a surface treating path of a rotating tool in the region nearest to the concave portion, the material between the concave portion and the rotating tool flows in a direction opposite to the travel of the rotating tool.

And preferably, when a surface of a cast which has concave portions is stirred for refining without melting it by the heat from a rotating tool, the treating region can be made wider while preventing the shoulder deformation from occurring at an edge of the concave portion with the use of this non-melting treatment by preferably performing the surface treatment such that, in the surface treating path of a rotating tool in the region nearest to the concave portion, the material between the concave portion and the rotating tool flows in a direction which is the same as the traveling direction of the rotating tool.

And preferably, when the surface of a cast which is subjected to the perforating is stirred for refining without melting it by the heat from a rotating tool, the finish can be applied to a product without leaving terminal holes in the product by preferably performing the surface treatment such that a terminal point of the surface treating path created by the rotating tool is in a position subjected to the perforating by the use of the rotating tool whose diameter is smaller than that of the hole in the perforating.

And preferably, when a plurality of concave portions exist, treating regions can be made wider and deeper while preventing unfilled defects from occurring due to the deformation of the material by refining the regions between concave portions with the use of the rotating tool and by setting the surface treating paths so that the refining regions are overlapped.

And preferably, the finish can be applied to a product without leaving terminal holes in the product by setting the terminal holes of the surface treating paths so that the paths are passing through the start points of the surface treating paths.

And preferably, the cast is a cylinder head having a pair of intake ports and a pair of exhaust ports corresponding to a plurality of cylinders, the treating region can be made wider and deeper while preventing unfilled defects from occurring due to the deformation of the material by performing the surface treatment wherein a continuous treatment is performed along a longitudinal direction of the cylinder head between the pair of exhaust ports and the pair of intake ports and subsequently performed from cylinders adjacent to the position and between the above described exhaust ports and intake ports.

What is claimed is:

1. A surface treating method in which a surface of a cast having concave portions is stirred for a refining by a rotating tool having a protrusion, the rotating tool being pressed with respect to the surface of the cast, without melting the cast by a heat from the rotating tool, the method comprising:

pressing and moving the rotating tool, which is rotating, along a surface treating path in a region which is in the closest vicinity of one of the concave portions, so as to have a material between the one concave portion and the protrusion of the rotating tool flow in the same direction as a travel of the rotating tool; and treating the surface of the cast so as to have a treated region between the one concave portion and the protrusion of the rotating tool be smaller than a treated region in which a material thereof flows in the opposite direction of the travel of the rotating tool.

2. The surface treating method according to claim 1, further comprising creating a hole by perforating a terminal point of the surface treating path of the rotating tool, wherein the treating of the surface of the cast includes using the rotating tool having a diameter which is smaller than that of the hole.

3. The surface treating method according to claim 1, wherein the pressing and moving of the rotating tool includes pressing and moving the rotating tool in other regions between the concave portions so as to refine the regions thereof, and setting corresponding surface treating paths thereof so as to overlap the refined regions.

4. The surface treating method according to claim 1, wherein:

the surface treating path includes a start point and a terminal point, and the start and terminal points are set such that a path to the terminal end point passes through the start point.

5. The surface treating method according to claim 1, wherein:

the cast is a cylinder head having a pair of intake ports and a pair of exhaust ports corresponding to a plurality of cylinders, and the treating of the surface of the cast includes pressing and moving the rotating tool along a longitudinal direction of the cylinders, between the pair of exhaust ports and between the pair of intake ports, and along respective paths between the exhaust and intake ports.

6. A treated member having a surface refined according to the surface treating method of claim 1.

7. The surface treating method according to claim 1, further comprising providing a cored hole on the surface of the cast corresponding to a start point of the surface treating path of the rotating tool.

8. A method of treating a surface of a cast having concave portions using a rotating tool having a protrusion, without melting the cast by a heat from the rotating tool, the method comprising:

positioning the rotating tool at an area between the concave portions; and stirring the surface of the cast including rotating, pressing and moving the rotating tool along a surface treating path to treat first and second regions of the area, wherein the positioning of the rotating tool includes providing the protrusion of the rotating tool between the first and second regions so as to have the first region be in the closest vicinity of one of the concave portions, and the treating of the first and second regions includes rotating, pressing and moving the rotating tool so as to have a material of the first region flow in the same direction as a travel of the rotating tool while a material of the second region flow in the opposite direction of the travel, and to have the first treated region be smaller than the second treated region.

9. A treated member having a surface refined according to the method of claim 8.

* * * * *